US012755050B2

(12) United States Patent
McCaig et al.

(10) Patent No.: US 12,755,050 B2
(45) Date of Patent: Oct. 6, 2026

(54) DATA ENCRYPTION AT A PERSONAL DATA SHARING PLATFORM

(71) Applicant: Tartle PBC, Santa Fe, NM (US)

(72) Inventors: Alexander Ramsay McCaig, Santa Fe, NM (US); Dania Ellen Simmons, Key Largo, FL (US); Gustavo Gallegos, West Hollywood, CA (US)

(73) Assignee: Tartle PBC, Santa Fe, NM (US)

( * ) Notice: Subject to any disclaimer, the term of this patent is extended or adjusted under 35 U.S.C. 154(b) by 82 days.

(21) Appl. No.: 18/422,960

(22) Filed: Jan. 25, 2024

(65) Prior Publication Data

US 2025/0245376 A1 Jul. 31, 2025

(51) Int. Cl.

| | |
|---|---|
| ***G06F 21/62*** | (2013.01) |
| ***H04L 9/00*** | (2022.01) |
| ***H04L 9/08*** | (2006.01) |
| ***H04L 9/30*** | (2006.01) |
| ***H04L 9/40*** | (2022.01) |

(52) U.S. Cl.

CPC .......... *G06F 21/6245* (2013.01); *H04L 9/008* (2013.01); *H04L 9/0825* (2013.01); *H04L 9/3073* (2013.01); *H04L 63/0428* (2013.01); *H04L 63/0478* (2013.01); *H04L 2463/062* (2013.01)

(58) Field of Classification Search

CPC ...... G06F 21/60; G06F 21/62; G06F 21/6218; G06F 21/6245; H04L 63/04; H04L 63/0428; H04L 63/0478; H04L 2463/062; H04L 9/008; H04L 9/08; H04L 9/0816; H04L 9/0819; H04L 9/0825; H04L 9/30; H04L 9/3066; H04L 9/3073

See application file for complete search history.

(56) References Cited

U.S. PATENT DOCUMENTS

| | | | | |
|---|---|---|---|---|
| 6,665,659 | B1 | 12/2003 | Logan | |
| 6,691,231 | B1 | 2/2004 | Lloyd et al. | |
| 7,580,521 | B1 * | 8/2009 | Spies | H04L 9/3073 380/282 |
| 9,094,379 | B1 * | 7/2015 | Miller | H04L 9/14 |

(Continued)

OTHER PUBLICATIONS

International Search Report and Written Opinion mailed on Mar. 19, 2025, on application No. PCT/US2025/012796.

(Continued)

*Primary Examiner* — D'Arcy Winston Straub

(74) *Attorney, Agent, or Firm* — Lowenstein Sandler LLP

(57) ABSTRACT

A method for data encryption at a personal data sharing platform includes: receiving, from a first client device associated with a first user account of a personal data sharing platform, a request for a dataset having attributes associated with personal data; receiving, from a second client device associated with a second user account of the personal data sharing platform, a first dataset including one or more personal data values that correspond to the attributes of the requested dataset; and responsive to the request for the dataset having the attributes associated with personal data, providing, to the first client device, the first dataset including the one or more encrypted personal data values and partially decrypted information for obtaining a first private key for decrypting the encrypted personal data values.

17 Claims, 11 Drawing Sheets

(56) References Cited

U.S. PATENT DOCUMENTS

| | | | |
|---|---|---|---|
| 10,091,325 | B2 | 10/2018 | Jung |
| 10,476,847 | B1 | 11/2019 | Smith et al. |
| 11,831,618 | B2 | 11/2023 | McCaig |
| 2005/0138398 | A1 | 6/2005 | Hansen |
| 2010/0153704 | A1 | 6/2010 | Winslow |
| 2011/0040736 | A1 | 2/2011 | Kalaboukis et al. |
| 2013/0042298 | A1 | 2/2013 | Plaza Fonseca et al. |
| 2013/0268357 | A1 | 10/2013 | Heath |
| 2015/0180839 | A1 | 6/2015 | Moffat |
| 2016/0050185 | A1 | 2/2016 | Wilson |
| 2017/0070500 | A1 | 3/2017 | Hockey et al. |
| 2017/0331887 | A1 | 11/2017 | Fishler et al. |
| 2018/0012032 | A1 | 1/2018 | Radich et al. |
| 2018/0322597 | A1 | 11/2018 | Sher |
| 2020/0320219 | A1 | 10/2020 | Barouch |
| 2021/0051003 | A1 | 2/2021 | Jarjoui et al. |
| 2021/0359835 | A1* | 11/2021 | Winstrom ............. H04L 63/068 |
| 2023/0016036 | A1 | 1/2023 | Friel et al. |
| 2024/0146698 | A1* | 5/2024 | McCaig .............. H04L 63/0414 |

OTHER PUBLICATIONS

International Search Report and Written Opinion mailed on Oct. 1, 2020, on application No. PCT/US2020/041068.

Wang S, Zhang Y, Zhang Y. A blockchain-based framework for data sharing with fine-grained access control in decentralized storage systems. Ieee Access. Jun. 29, 2018;6:38437-50.

* cited by examiner

*continued in FIG. 4B* continued from FIG. 4A continued in FIG. 4C

*continued from FIG. 4B*

*continued in FIG. 6B*

DATA ENCRYPTION AT A PERSONAL DATA SHARING PLATFORM

TECHNICAL FIELD

Aspects and embodiments of the disclosure relate to data encryption, and more specifically, to systems and methods for data encryption at a personal data sharing platform.

BACKGROUND

Data encryption includes encoding information to convert the information from plaintext, which may be readable by anyone, to an encrypted text, such as ciphertext that can only be decrypted (i.e., converted back to the plaintext) by a party that has certain cryptographic information (e.g., a cryptographic key). Encryption can be performed using symmetric-key encryption, where the same cryptographic key is used to encrypt and decrypt the information, or asymmetric encryption, where different keys are used to encrypt and decrypt the information.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure provides a computer-implemented method for data encryption at a personal data sharing platform, including: receiving, from a first client device associated with a first user account of a personal data sharing platform, a request for a dataset having attributes associated with personal data; receiving, from a second client device associated with a second user account of the personal data sharing platform, a first dataset including one or more personal data values that correspond to the attributes of the requested dataset, wherein the one or more personal data values are encrypted using at least a first public key; and responsive to the request for the dataset having the attributes associated with personal data, providing, to the first client device, the first dataset including the one or more encrypted personal data values and partially decrypted information for obtaining a first private key corresponding to the first public key of a key pair, wherein the first private key is configured to at least partially decrypt the one or more encrypted personal data values.

In some embodiments, each personal data value of the one or more personal data values of the first dataset is individually encrypted using the first public key, and the first dataset further includes the attributes associated with personal data in an unencrypted state.

In one embodiment, the method further includes generating the first public key and the first private key responsive to receiving the request for the dataset. In one or more embodiments, the method further includes providing, to the second client device associated with the second user account, the first public key.

In some embodiments, providing the first dataset to the first client device is further responsive to receiving, at the personal data sharing platform, an indication that a value item was transferred from a first account associated with the first user account to a second account associated with the second user account.

In one embodiment, the method further includes: encrypting the first private key with a second public key, the second public key and a second private key being associated with the first user account, and encrypting the encrypted first private key using a personal data sharing platform key to generate a cascade-encrypted first private key. Providing, to the first client device, the partially decrypted information for obtaining the first private key further includes: decrypting an outer layer of the cascade-encrypted first private key to generate the encrypted first private key and providing the encrypted first private key to the first client device for decryption using the second private key.

In some embodiments, the personal data sharing platform key includes a symmetric cryptographic key associated with the personal data sharing platform or a public key associated with the personal data sharing platform.

An aspect of the disclosure provides a computer-implemented method for identifying user account groupings at a personal data sharing platform, including: receiving, via a first user account of a group of user accounts of a personal data sharing platform, a first request for first personal data, the first request identifying first criteria related to the requested first personal data and second criteria related to characteristics that qualify user accounts for providing the first personal data; evaluating encrypted personal data associated with the group of user accounts to identify a subset of the group of user accounts that satisfy the second criteria; and sending, to the subset of user accounts, second requests for personal data that satisfies the first criteria related to the requested first personal data. In some embodiments, evaluating the encrypted personal data associated with the group of user accounts to identify the subset of user accounts that satisfy the second criteria is performed without decrypting the encrypted personal data.

In one embodiment, the first criteria identify one or more inquires for the requested first personal data.

In some embodiments, the method further includes, prior to receiving the first request for first personal data, receiving, via the first user account, a first previous request for second personal data, the first previous request identifying third criteria related to the second personal data; sending, to one or more user accounts, a second previous request for personal data that satisfy the third criteria related to the requested second personal data; and receiving, from among the one or more user accounts, previous responses to the second previous request from the group of user accounts, the previous responses including the encrypted personal data related to the third criteria.

In one or more embodiments, the method further includes, responsive to receiving the first request for the first personal data, identifying, among one or more user accounts, the group of user accounts that provided the responses to the second previous request for personal data.

In one embodiment, the encrypted personal data is first encrypted personal data, and the method further includes, responsive to sending the second requests for personal data, receiving responses to the second requests from one or more user accounts of the group of user accounts. The responses include second encrypted personal data related to third criteria, and the second encrypted personal data includes one or more attribute identifiers and one or more encrypted data values corresponding to the one or more attribute identifiers.

In one embodiment, evaluating the encrypted personal data associated with the group of user accounts to identify the subset of user accounts that satisfy the second criteria is performed without decrypting the encrypted personal data. In some embodiments, evaluating the encrypted personal data associated with the group of user accounts to identify the subset of user accounts that satisfy the second criteria includes, for each user account of the group of user accounts: identifying respective encrypted personal data including a dataset, the dataset including one or more encrypted data values; generating one or more hash values based on the second criteria, the one or hash values corresponding to respective encrypted data values of the one or more encrypted data values; determining whether the one or more hash values and the respective encrypted data values satisfy a condition; and responsive to determining that the one or more hash values and the respective encrypted data values satisfy the condition, associating the respective user account with the subset of user accounts. In some embodiments, generating the one or more hash values based on the second criteria includes generating the one or more hash values using a hash function and data unique to the respective user account. In one embodiment, the respective encrypted data values of the one or more encrypted data values and the one or more hash values are generated using a same hash function. In some embodiments, a first portion of the encrypted data values are encrypted using a hash function, and a second portion of the encrypted data values are encrypted using a cryptographic key.

A further aspect of the disclosure provides a system that includes a memory and a processing device, coupled to the memory. The processing device is configured to perform a method according to any aspect or embodiment described herein. A further aspect of the disclosure provides a computer-readable medium that includes instructions that, responsive to execution by a processing device, cause the processing device to perform operations that include a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1:
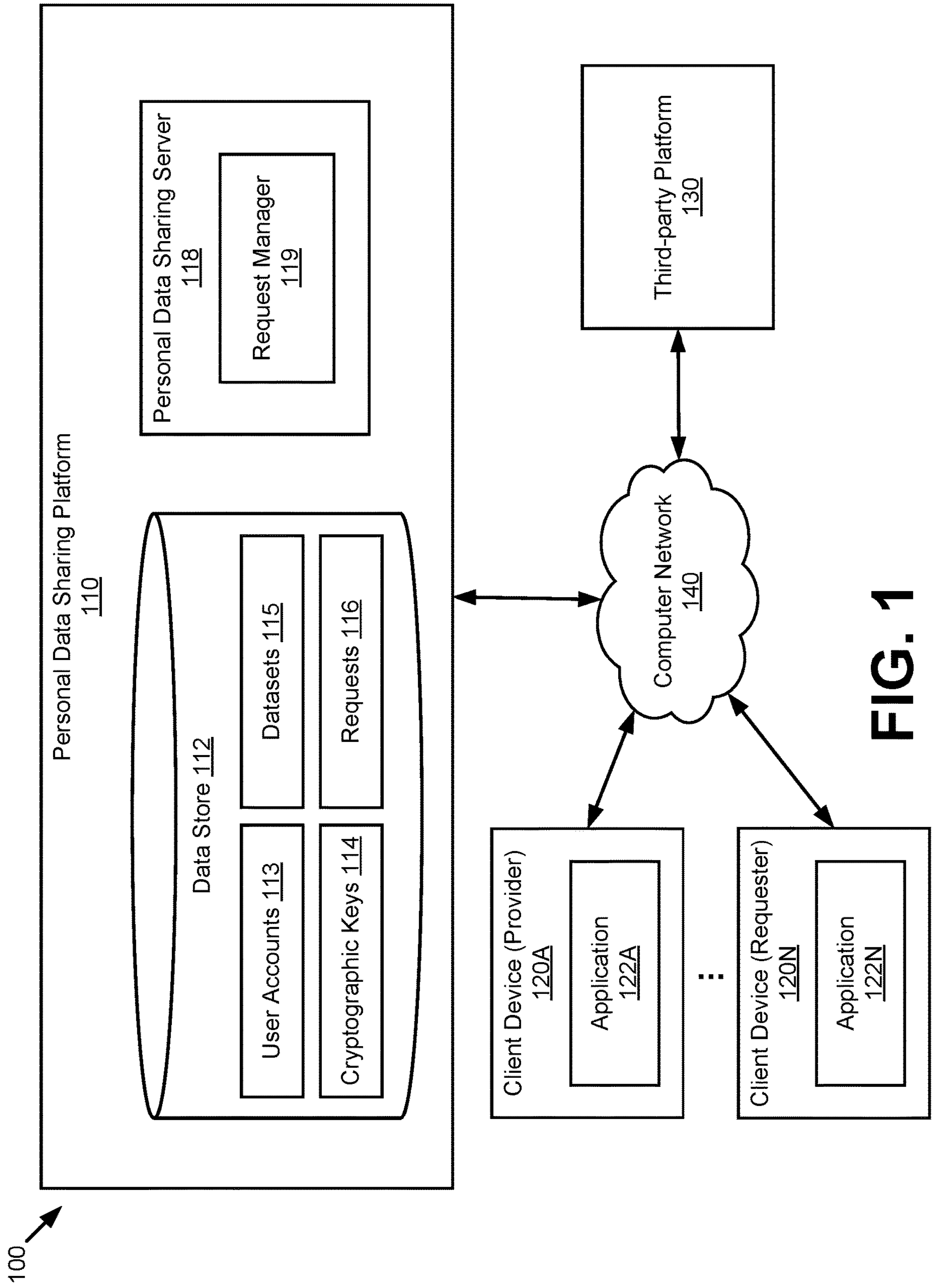
FIG. 1 is a block diagram illustrating an example system architecture for data encryption or user account grouping identification at a personal data sharing platform, in accordance with some embodiments of the disclosure.

Personal data can include any information that is related to an identified or identifiable natural person. Personal data can include information that can identify, relate to, describe, be associated with, or be reasonably capable of being associated with a particular natural person. Personal data can include any data where a natural person expended time or labor to create the data. The data subjects may be identifiable if they can be directly or indirectly identified, in particular by reference to an identifier such as a name, an identification number, location data, an online identifier or one of several characteristics, which expresses the physical, physiological, genetic, mental, commercial, cultural or social identity of these natural persons. Personal data can include all data which are or can be assigned to a person in any kind of way. Personal data can be part of a natural person's digital identity.

Some systems can collect, store and/or exchange personal data between parties. These systems often encrypt portions of the personal data stored on the systems and also decrypt the personal data at the system to perform various operations or even to transfer the personal data to another party. The availability of unencrypted personal data compromises the security of the personal data and allows for malicious activity with respect to the personal data. Providing a secure environment that protects and stores personal data, allows decisions to be performed based on the encrypted personal data, and/or securely transfers the personal data between parties can be a challenge for such systems.

Additionally, a user of one of these personal data collection systems may desire to obtain the personal data of other users of the system (e.g., to gather data for data analytics purposes, research, etc.). However, the user may only be interested in a small subset of the system's users who meet some specific criteria. To gather such information, the obtaining user often generates a process to request personal data, often unencrypted, from the system's users (e.g., in the form of a survey, questionnaire, or other data-gathering process). These systems may access unencrypted personal data to determine whether characteristics of users satisfy the specific criteria-which can compromise the security of the personal data and may provide an avenue of exploitation to malicious actors. In some cases, after users provide their personal information in response to the request process, the obtaining user may only be able to use a small subset of the users' responses where the users or their responses fit the specific criteria. This can result in many users participating in the data request process unnecessarily, which is an inefficient use of the system's and the users' devices' computing resources and network bandwidth. It can also result in the unnecessary securing and storage of personal information-which is an inefficient use of computational and storage resources.

Some aspects of the disclosure address the above-mentioned and other challenges by providing a system of personal data encryption using a personal data sharing platform. In some embodiments, a first user (e.g., a providing user or provider) of the personal data sharing platform may provide personal data to the first user's client device (e.g., via a software application provided by the personal data sharing platform). The client device may encrypt the personal information using the first user's public key. The client device then sends the encrypted personal data to a server of the personal data sharing platform for storage. The server receives the personal data in its encrypted state, and the server does not have access to the first user's private key and, thus, cannot decrypt the first user's personal data.

In some embodiments, a second user (e.g., a requesting user or requester) may request, via the personal data sharing platform, personal data that satisfies some criteria (e.g., having particular attributes). The second user's client device may send the request for the personal data to the server. The server may generate a public-private key pair specific to the request (e.g., a request key pair) and cascade encrypt the request private key (e.g., provide multiple layers of encryption). The server may then determine which encrypted personal data (e.g., datasets) associated with various provider user accounts of the platform satisfy the criteria (e.g., personal data criteria) of the request. As noted above and in some embodiments, the personal data can be encrypted, and in some instances the personal data can include personal data values that are individually encrypted and associated with unencrypted attributes to form attribute-value pairs. To determine whether the encrypted personal data satisfies the criteria, the server can evaluate the attributes of the personal data without decrypting the encrypted personal data values—and thus, maintain the security of the personal data.

In some embodiments, for personal data that is determined to satisfy the criteria, the server may then send, to respective provider user accounts, one or more of respective encrypted personal data, information about the second user's request, the requester's public key, and the request public key. The providing users, if they choose to provide their personal data to the second user's account, may locally decrypt their personal data (using their own respective private keys) and re-encrypt the personal data using one or more cryptographic keys. For instance, in some embodiments the provider's client device can cascade encrypt the personal data values using the requestor's public key and the request public key. The providing users then send their re-encrypted personal data back to the server.

In some embodiments, the server may wait to receive a confirmation that the second user (requesting user) has provided something of value to the users (e.g., providers) that provided their personal data in response to the second user's request. Responsive to receiving such confirmation, the server may partially decrypt the cascade-encrypted request private key, send the partially decrypted request private key to the second user's client device, and send the encrypted personal data to the second user's client device. The second user client device may then complete the decryption of the request private key and use the request private key to decrypt the personal data. The second user may then be able to use the personal data (e.g., for data analytics purposes, research, etc.).

Some aspects of the disclosure address the above-mentioned and other challenges by providing a system capable of identifying user account groupings, among a set of user accounts, that are selected to provide personal data at a personal data sharing platform. In some embodiments, a user account requesting personal data from the personal data sharing platform can send a request for personal data to the server of the platform. The request may identify first criteria (e.g., personal data criteria) related to the requested personal data (e.g., defining what personal data is being requested, such as the categories, fields, types, etc. of personal data) and second criteria (e.g., provider criteria) related to characteristics that qualify user accounts for providing the requested personal data (e.g., defining characteristics of the users and/or user accounts sought to provide the personal data). The server may evaluate encrypted personal data to identify a subset of the user accounts of the platform that satisfy the provider criteria. The server may perform the evaluation of the provider criteria without decrypting the personal data.

For example and in some embodiments, the personal data as noted above can be provided as one or more datasets having attributes (e.g., unencrypted attributes) and personal data values (e.g., encrypted personal data values) as attribute-value pairs. In some instances, some personal data values (e.g., more sensitive data values, such as social security numbers) can be encrypted using cryptographic keys to generate ciphertext and some personal data values (e.g., less sensitive personal data values, such as favorite color) can be encrypted using a hash function to generate hash values. In some embodiments, to evaluate the encrypted personal data to identify a subset of user accounts that satisfy the provider criteria, the personal data sharing platform can generate a hash value for a particular attribute and compare the generated hash value with a corresponding the personal data hash value. If the two hash values satisfy a condition (e.g., match), the personal data sharing platform can infer the original personal data value (e.g., the user's favorite color is blue). The inference can be used to determine whether a user account satisfies the provider criteria—and more broadly identify a subset of user accounts, among a set of user accounts, that satisfy the provider criteria.

In some embodiments, the server may send requests to the subset of user accounts, and the requests may include requests to provide personal data that satisfy at least some of the personal data criteria of the requesting user's request. The users may then choose whether to provide personal data in response to the requests. If so, the provider client devices may encrypt their personal data and send the encrypted personal data to the server, which may send the encrypted personal data to the requester's client device and information used to decrypt the personal data, as discussed above. In some embodiments, the server can determine whether the encrypted personal data satisfies the personal data criteria without decrypting the personal data in a similar manner as described above.

As noted, a technical problem addressed by embodiments of the disclosure is the secure storage, transfer, and/or use of personal data. A technical solution may include the data encryption structures and processes that encrypt and decrypt personal data and that allow for one or more of secure storage, transfer and/or use of personal data. Such data encryption structures and processes may include one or more of generating a request-specific public-private key pair, cascade-encrypting the request private key, decrypting and re-encrypting personal data on a provider user's client device, and partially decrypting the request private key.

Another technical problem addressed by embodiments of the disclosure is the secure determination of personal data that satisfies one or more request criteria. A technical solution may include the encrypted personal data evaluation structures and processes disclosed herein that allow for the determination of whether encrypted personal data satisfies criteria of a request without decrypting the personal data. Such encrypted personal data evaluation structures and processes can include one or more of receiving requests of personal data that include personal data criteria and provider criteria, evaluating encrypted personal data associated with a group of user accounts to identify a subset of the group that satisfy the provider criteria, and sending requests to the subset of user accounts that for personal data that satisfies the personal data criteria of the request. The encrypted personal data evaluation structures and processes may also allow the gathering of personal information tailored to the request, which results in more efficient use of computing resources and/or improved security in the use of personal data.

FIG. 1 is a block diagram illustrating an example system architecture 100 for data encryption or user account grouping identification at a personal data sharing platform, in accordance with some embodiments of the disclosure. The system architecture 100 (also referred to as a "system" herein) includes one or more of a personal data sharing platform 110 (also referred to as a "platform" herein), client devices 120A-120B (generally referred to as "client device (s) 120" herein), and a third-party platform 130 connected to a network 140.

In some embodiments, the personal data sharing platform 110 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide client devices 120A-N with access to respective content items or services of the platform 110. For example, the personal data sharing platform 110 may allow client devices 120A-N to consume, upload, search for types of, or transfer personal data. The personal data sharing platform 110 may also include a website (e.g., a webpage) or application back-end software that may be used to provide a client device 120A-N with access to the personal data sharing platform 110.

In one embodiment, the platform 110 may include a data store 112. The data store 112 includes one or more persistent storages that are capable of storing content items as well as data structures to tag, organize, and index the content items. The data store 112 may be hosted by one or more storage devices, such as a main memory, magnetic or optical storage-based disks, tapes or hard drives, a network-attached storage (NAS), a storage area network (SAN), and so forth. In some embodiments, the data store 112 may be a network-attached file server, while in other embodiments, the data store 112 may be some other type of persistent storage such as an object-oriented database, a relational database, and so forth, that may be hosted by the personal data sharing platform 110 or one or more different machines coupled to the personal data sharing platform 110 via the network 140. In some embodiments, the data store 112 may store one or more user accounts 113, cryptographic keys 114, datasets 115, requests 116, or user account groupings, as described further below.

In some embodiments, the platform 110 may include a personal data sharing server 118 (sometimes referred to, herein, as a "server"). The server 118 may include one or more computing devices (such as a rackmount server, a router computer, a server computer, a mainframe computer, etc.). The server 118 may include software components or hardware components that may be used to perform functions related to data encryption and user account grouping, as described further below. The server 118 may perform other personal data sharing functionality. Platform 110 may include any number of servers, in some embodiments.

In one or more embodiments, the server 118 may include a request manager 119. The request manager 119 may include a hardware implementation, a software implementation, or a combination of hardware and software. The request manager 119 can perform one or more operations, as described herein. In some embodiments, the request manager 119 can receive personal data from one or more client devices 120, receive requests for personal data from a client device 120, evaluate one or more datasets 115 to determine if a dataset satisfies criteria identified in a request, send requests for personal data to one or more client devices 120, or perform one or more operations as described herein. In some embodiments, the request manager 119 can be implemented, in whole or in part, at other devices, such as but not limited to, one or more of the client devices 120.

In some embodiments, the client devices 120A-120N may each include a computing device such as a personal computer (PC), laptop, mobile phone, smart phone, tablet computer, netbook computer, network-connected television, etc. As seen in FIG. 1, a first client device 120A can be referred to as a "provider client device," and a second client device 120N can be referred to as a "requester client device" to represent different parties accessing the personal data sharing platform 110. A provider client device 120A can refer to a client device (and an associated provider user account) that provides personal data of the associated user to the personal data sharing platform 110. The requester client device 120N can refer to a client device (and an associated requester user account) that requests and/or receives personal data provided to the personal data sharing platform 110 by one or more provider user accounts.

In some embodiments, each client device 120A-N can include an application 122A-N. In some embodiments, the applications 122A-N may be applications that allow the client devices 120A-N to access and communicate with the personal data sharing platform 110. For example, the application 122 may be a web browser that can access, retrieve, present, or navigate content (e.g., web pages such as Hypertext Markup Language (HTML) pages, etc.) served by a web server. The application 122 may render, display, or present the content (e.g., a web page, a media viewer, etc.) via a display screen to a user of a client device 120A-N. The application 122 may also include an embedded media player (e.g., an HTML5 player) that is embedded in a web page. In another example, the application 122 may be a standalone application (e.g., a mobile application or native application) that allows the client devices 120A-N to access and use the personal data sharing platform 110. According to some embodiments of the disclosure, the application 122 may be a personal data sharing platform application for users to select, edit, and/or upload content, such as personal data, for sharing or transfer on the personal data sharing platform 110.

In certain embodiments, the third-party platform 130 may include one or more computing devices, data stores, networks, software components, or hardware components that may be separate from the platform 110. Third-party can refer to an entity, such as legal entity, that is not part of personal data sharing platform 110. For example, the personal data sharing platform 110 (and/or client device 120A-120N) can be a first party and associated with an entity, and the third-party platform 130 can be associated with a different entity. The third-party platform 130 may facilitate a transfer of a value item between user accounts of the third-party platform 130. A value item (e.g., medium of exchange) can refer to any item that is deemed by the user receiving the value item or the user providing the value item to have a value (e.g., measurable value). In some embodiments, users of the personal data sharing platform 110 can establish respective user accounts at the third-party platform 130. In some embodiments, the personal data sharing platform 110 can make application programming interface (API) requests to the third-party platform 130 to request information pertaining to a transfer of a value item from one user account to another user account (e.g., from recipient user account to provider user account) of the third-party platform 130. The third-party platform 130 may send API requests to the platform 110 that include information pertaining to a transfer of a value item from one user account to another user account of the third-party platform 130. In some cases, the respective entities that own, operate, or control the platform 110 and the third-party platform 130 may be different. In some embodiments, the platform 110 may include the value item transfer functionality.

In some embodiments, the network 140 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In embodiments of the disclosure, a "user" may be represented as a single individual. However, other embodiments of the disclosure encompass a "user" being an entity controlled by a set of users and/or an automated source. For example, a set of individual users federated as a community or entity may be considered a "user."

In some embodiments, a user may access the platform 110 through a user account of the user accounts 113. The user may access (e.g., log in to) the user account by providing user account information (e.g., username and password) via an application 122A on the user's client device. In some embodiments, the user account may be associated with a single user. In other embodiments, the user account may be a shared account (e.g., family account shared by multiple users) (also referred to as a "shared user account" herein). The shared account may have multiple user profiles, each associated with a different user. The multiple users may login to the shared account using the same account information or different account information. In some embodiments, the multiple users of the shared account may be differentiated based on the different user profiles of the shared account.

The data store 112 may store information about the user accounts 113. For example, the user accounts may each include login information, configuration information, preferences, or other account information. The user accounts 113 may include data logically linking a user account to a dataset in the datasets 115 that the user account provided to the server 118.

In one embodiment, the data store 112 may store one or more cryptographic keys 114. The cryptographic keys 114 can include one or more symmetric keys used to encrypt and decrypt data associated with the personal data sharing platform 110. The cryptographic keys 114 can include one or more private keys used by the server 118. In some embodiments, the one or more private keys are accessible by one or more approved administrators of the personal data sharing server 118. In some embodiments, cryptographic key management can be performed by a third-party system and the one or more private keys can be stored at the third-party system. In some embodiments, the cryptographic keys 114 can include one or more public keys. The public keys may include public keys corresponding to private keys used by the server. The public keys can include public keys corresponding to user accounts of the user accounts 113. The user account public keys can be used to encrypt data that are to be sent to client devices 120. The client devices' 120 applications 122 may include the corresponding private keys that can decrypt the encrypted data.

In some embodiments, the datasets 115 may include personal data of a particular user of the personal data sharing server 118 where the particular user can authorize their respective dataset(s) of personal data (or a portion of a respective dataset) to be requested for access by other user accounts of the personal data sharing server 118. In some embodiments, a dataset may be encrypted at a client device 120 and provided to the personal data sharing server 118 for storage in the datasets 115 of the data store 112. In some embodiments, a dataset may be stored as an encrypted dataset. In some embodiments, some of the datasets 115 can each have a data structure that includes one or more attribute-value pairs (e.g., key-value pairs). In one embodiment, a dataset may include a schema. The schema may specify one or more attributes of a dataset. For example, a particular dataset type can specify the attributes of age, date of birth, gender, and received vaccinations.

In some embodiments, the data store 112 may store one or more requests 116. A request may include a request from a user account of the personal data sharing platform 110 for the platform 110 to provide personal data of other user accounts of the platform 110 to the requesting user account. A request may include one or more criteria (also referred to as "provider criteria" herein) specifying characteristics of users that the requesting user would like personal data from and/or criteria (also referred to as "personal data criteria" herein) specifying which attributes 206 that the requesting user requests. In some embodiments, a request may be relatively simple (e.g., a request for the ages and birth years and all users who live in a specific city) or may be relatively complex with one or more sub-requests (e.g., a request for the ages of all users who live in a specific city, divided into two groups (users over the age of 35 and users under the age of 35); and of the group of users over age 35, the date the users received a flu vaccination). The data store 112 may store the requests 116 received from requesting users. The request manager 119 may perform functionality to provide, to requesting users, personal data responsive to the received requests 116.

Figure 2:
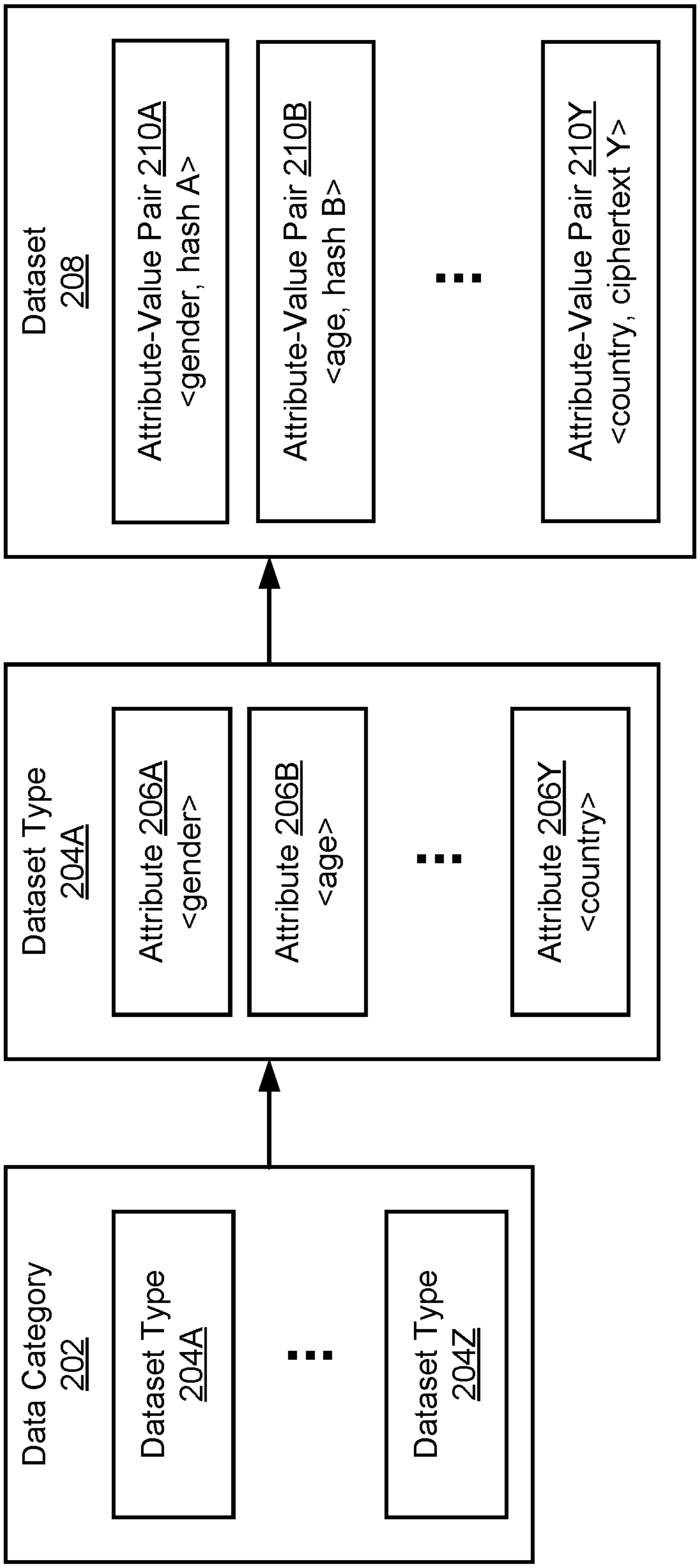
FIG. 2 is a block diagram illustrating an example data category, an example dataset type, and an example dataset for data encryption or user account grouping identification at a personal data sharing platform, in accordance with some embodiments of the disclosure.

FIG. 2 is a block diagram illustrating an example data category 202, an example dataset type 204, and an example dataset 208 for data encryption or user account grouping identification at a personal data sharing platform 110, in accordance with some embodiments of the disclosure. In one embodiment, a data category 202 may include a category of data stored by the personal data sharing platform 110. A data category 202 may include a class of personal data that shares particular features. A class can include healthcare, finance, education, housing, travel, communication, etc. A data category 202 may include one or more dataset types 204. For example, in FIG. 2, the dataset type 204A may belong to the data category 202. A dataset type 204 may include a template, schema, etc. for a dataset 208. A dataset type 204 may include a one or more attributes 206. An attribute 206 may include a characteristic that will be provided by a user in order to create a dataset 208 that follows the template, schema, etc. of the dataset type 204. For example, as shown in FIG. 2, the dataset type 204A may include the attributes 206A ("gender"), 206B ("age"), . . . , 206Y ("country"). In some embodiments, an attribute 206 may include a question, inquiry, or other request for personal data. A user may provide personal data values (sometimes referred to, herein, simply as "values") corresponding to these attributes to create the dataset 208. In some embodiments, the attributes 206 of a particular dataset type 204 may be the same for every dataset 208 of a particular dataset type 204.

In some embodiments, a dataset 208 may include one or more attribute-value pairs 210. An attribute-value pair 210 may include data indicating an attribute 206. An attribute-value pair 210 may include one or more personal data values corresponding to the attribute 206 of the attribute-value pair 210. In one or more embodiments, a value may include a plaintext value of the personal data value. In some embodiments, the value may include a ciphertext of the personal data value. The value may have been input into an encryption function and may have been encrypted using a cryptographic key. The ciphertext resulting from the encryption may be included in the attribute-value pair 210. In one or more embodiments, the encryption function may include a homomorphic encryption function. Homomorphic encryption may allow computations or operations to be performed on the ciphertext without decrypting the ciphertext.

In some embodiments, the value may include a hash of the personal value (e.g., hash value). The personal data value (e.g., plaintext personal data value) may be used as input to a hash function, and the output hash may be included in the attribute-value pair 210. In certain embodiments, the input to the hash function may further include an attribute identifier. In some embodiments, the attribute identifier can include information that is used as input to the hash function to generate the hash. In some embodiments, the attribute identifier can include the plaintext of the attribute (e.g., "gender"). In some embodiments, the attribute identifier may include data that may be unique to the associated attribute 206 and/or user account. In some embodiments, the input to the hash function may further include a user identifier, such as a unique user identifier. The user identifier may include data that may be unique to the user account providing the value. As an example, the input to the hash function may include the user identifier, the attribute identifier (e.g., "age") appended to the user identifier, and then the personal data value appended to the attribute identifier. In some embodiments, using an input to the hash function that is unique to the user account can help protect personal data of other user accounts should a particular user account be compromised.

In one or more embodiments, the dataset 208 may be generated at a provider client device 120A. The encryption of one or more of the personal data values included in the attribute-value pairs 210 of the dataset 208 may occur at the client device 120A. The provider client device 120A may then provide the dataset 208 to the platform 110 to be stored as part of the datasets 115 of the data store 112. The generation of an encrypted dataset 208 at a provider client device 120A is illustrated in FIG. 3 in accordance with some embodiments.

Figure 3:
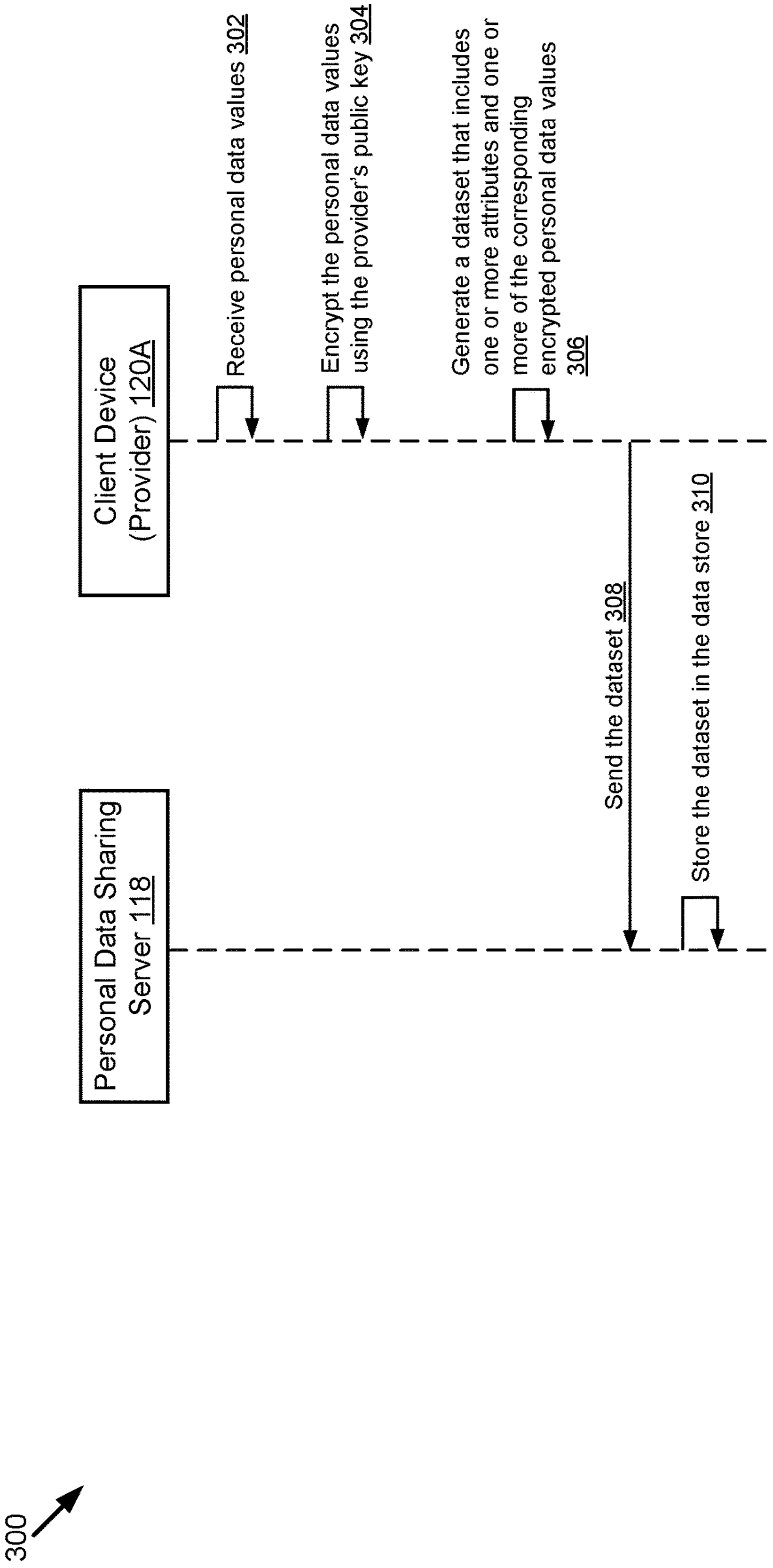
FIG. 3 is a sequence diagram illustrating an example flow of data for encrypting personal data for inclusion in a dataset and sending the dataset to a personal data sharing server, in accordance with some embodiments of the disclosure.

FIG. 3 shows a sequence diagram illustrating an example flow of data for encrypting personal data for inclusion in a dataset and sending the dataset to a personal data sharing server, in accordance with some embodiments of the disclosure. It can be noted that other flows of encrypting personal data at the provider client device 120A are possible, as described herein. The operations described with respect to FIG. 3 are shown to be performed serially for the sake of illustration, rather than limitation. It may be noted that in some embodiments the operations may be performed in any order or may be performed one or more times. In some embodiments, some operations may be omitted or may include the same or additional operations. In some embodiments, the operations illustrated as being performed by the client device 120A may be performed by application 122A. In some embodiments, operations illustrated as being performed by personal data sharing platform 110 may be performed by request manager 119.

FIG. 3 depicts an example embodiment of a dataflow 300 for encrypting a dataset 208 and providing the encrypted dataset 208 to the server 118. The dataflow 300 may include one or more components of the system 100 of FIG. 1, such as the server 118 or the provider client device 120A.

At operation 302, the process of generating and encrypting a dataset 208 may begin. The client device 120A associated with a user that is providing personal data (i.e., as indicated in FIG. 3, a "provider") may receive personal data values. For example, the user of the client device 120A may input the values into a user interface (UI) of a software application 122A executing on the provider client device 120A. The client device 120A may receive the personal data values from a file stored on the client device 120A, or the client device 120A may receive the personal data values from a third-party computing device (e.g., over the network 140). The personal data values may include values corresponding to attributes 206 associated with a specific dataset type 204 of a data category 202.

At operation 304, the software application 122A may encrypt the personal data values using a cryptographic key, such as the provider's public key. In some embodiments, each of the personal data values can be individually encrypted with the provider's public key to generate ciphertext for each personal data value. In some embodiments, the provider's public key may include a public cryptographic key that forms part of a public-private key pair in a public-private key architecture. In some embodiments, the provider's public-private key pair may have been previously generated, e.g., when the provider created a user account on the personal data sharing platform. The encrypted personal data values may be included as ciphertext in one or more attribute-value pairs 210.

At operation 306, the software application may generate a dataset 208 that includes one or more attributes 206 and one or more corresponding encrypted personal data values.

At operation 308, the provider client device 120A may then provide the dataset 208 to the personal data sharing server 118.

At operation 310, the server 118 may store the dataset 208 in the data store 112 (operation 310). Since the encrypted personal data values in the dataset 208 are encrypted using the provider user's public key (see operation 304), and since the server 118 does not have access to the provider user's private key, the server 118, in some embodiments, may not be able to decrypt the encrypted personal data values in a dataset 208.

Figure 4A:
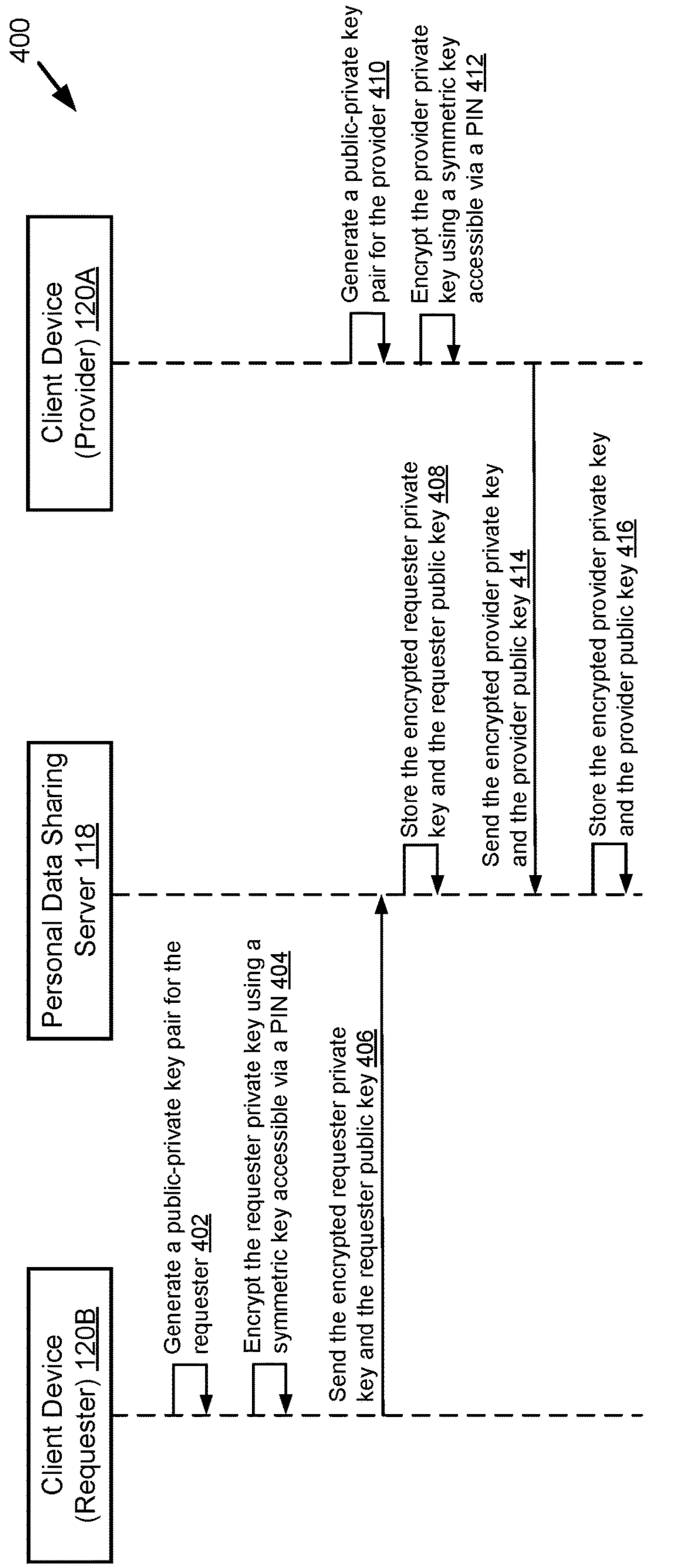
FIG. 4A is a sequence diagram illustrating a flow of data for data encryption at a personal data sharing platform, in accordance with some embodiments of the disclosure.
Figure 4B:
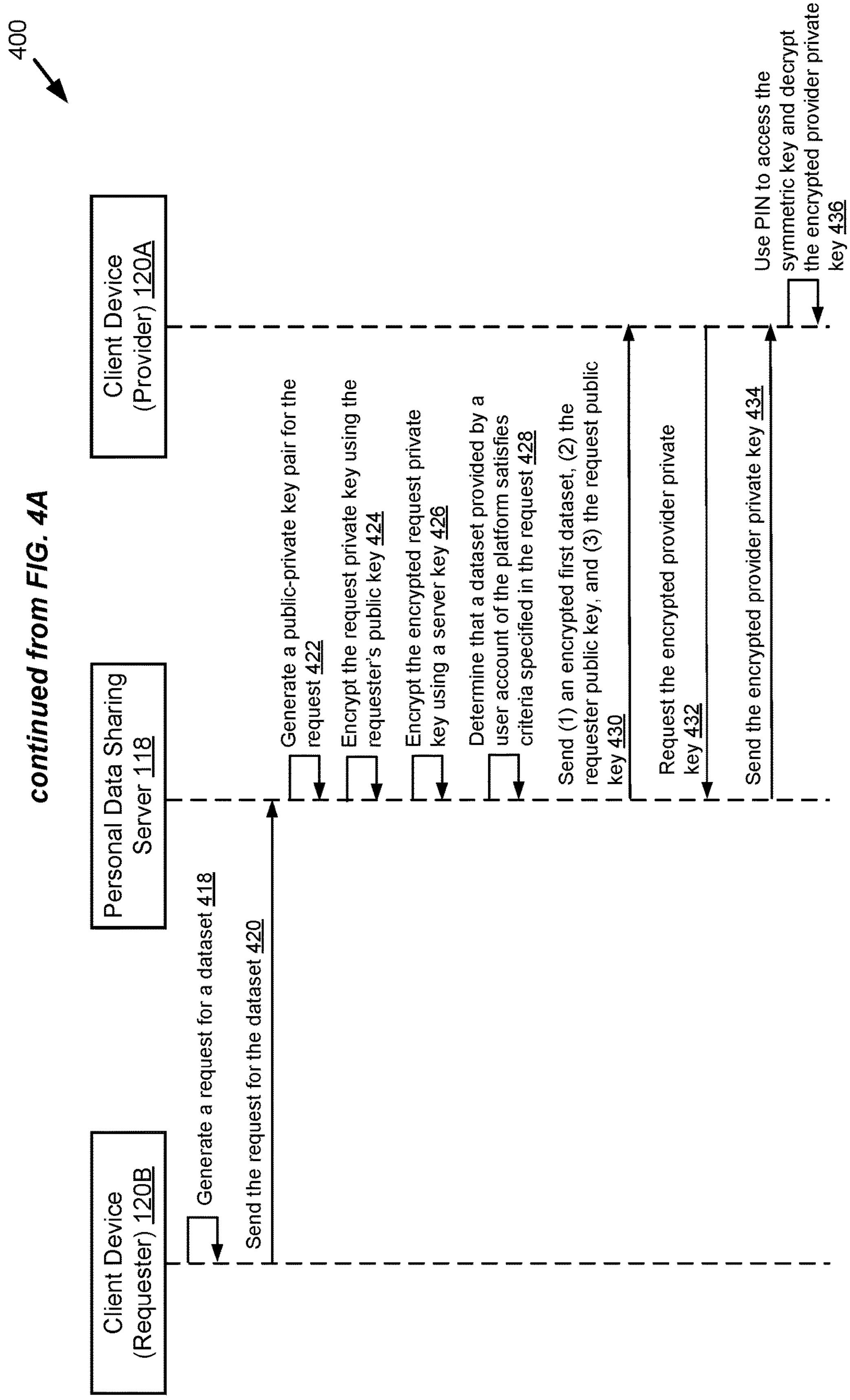
FIG. 4B is a sequence diagram illustrating a continuation of the flow of data in FIG. 4A, in accordance with some embodiments of the disclosure.
Figure 4C:
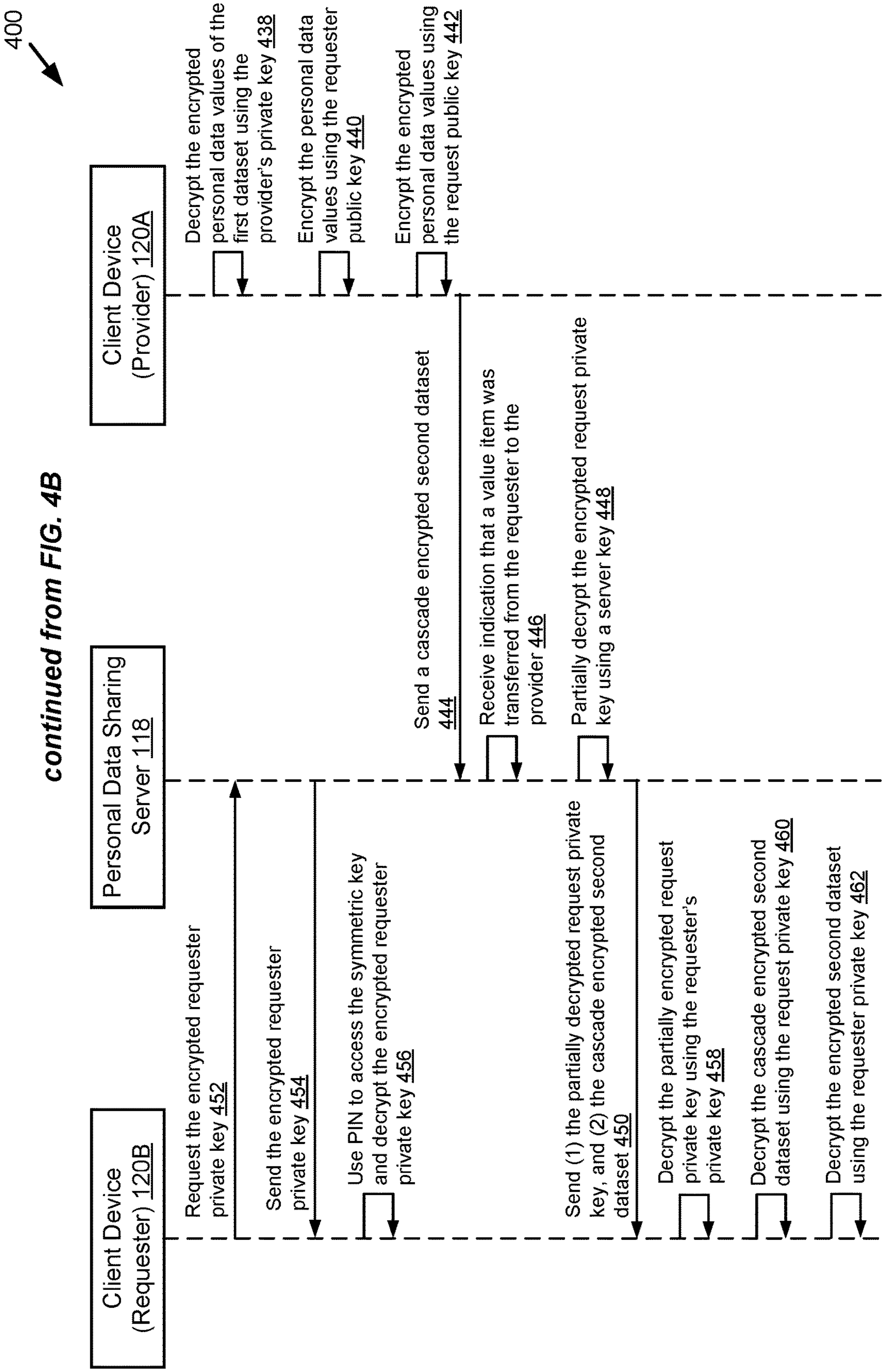
FIG. 4C is a sequence diagram illustrating a continuation of the flow of data in FIGS. 4A and 4B, in accordance with some embodiments of the disclosure.

FIGS. 4A-C are sequence diagrams illustrating an example data flow 400 for data encryption at a personal data sharing platform, in accordance with some embodiments of the disclosure. In some embodiments, one or more components of the system 100 of FIG. 1 may perform one or more of the operations of the data flow 400. The operations described with respect to FIG. 4A-C are shown to be performed serially for the sake of illustration, rather than limitation. It may be noted that in some embodiments the operations may be performed in any order or may be performed one or more times. In some embodiments, some operations may be omitted or may include the same or additional operations. In some embodiments, the one or more operations of a particular data flow (e.g., data flow 400) can be combined with one or more operations of one or more other data flows (e.g., data flow 300 and/or data flow 600). In some embodiments, the operations illustrated as being performed by client devices 120A and 120B may be performed by respective applications (e.g., application 122A and application 122B). In some embodiments, operations illustrated as being performed by personal data sharing platform 110 may be performed by request manager 119.

In FIG. 4A, the data flow 400 may begin, and at operation 402, the client device 120B associated with a user that is requesting personal data (i.e., as indicated in FIG. 4A, a "requester") may generate a public-private key pair for the requester. Operation 402 may execute in response to, e.g., the requester creating a user account on the personal data sharing platform. The requester client device 120B may store the public-private key pair.

At operation 404, the requester client device 120B may encrypt the requester's private key using a cryptographic key, such as symmetric key. In some embodiments, the symmetric key may be accessible via a personal identification number (PIN) known to the requester. In response to the requester inputting the PIN into the requester client device 120B, the requester client device 120B may unlock the private key so the requester can use the private key to perform various functionality on the requester client device 120B.

At operation 406, the requester client device 120B may send the encrypted requester private key to the server 118.

At operation 408, the server 118 may store the requester's encrypted private key. In some embodiments, the server 118 may store the requester's encrypted private key in the cryptographic keys 114 of the data store 112. The server 118 may store the requester's encrypted private key as a backup for the requester (e.g., in case the requester's client device 120B is lost or the requester's private key is accidently deleted from the requester client device 120B). In some embodiments, because the requester's private key was encrypted using a cryptographic key (e.g., a symmetric cryptographic key), and because the cryptographic key may not be known to the server 118, the server 118 may not have access to the requester's private key in an unencrypted state (which can enhance security of the personal data). In some embodiments, the requester client device 120B may send the requester's public key to the server 118 (either as part of operation 406 or separately). The requester's public key may not be encrypted so that the server 118 or other components of the personal data sharing platform can use the requester's public key (e.g., to encrypt data intended for the requester).

In operations 410-416, the provider client device 120A and the server 118 may perform operations similar to operations 402-408. At operation 410, the provider client device 120A may generate a public-private keypair for the provider.

At operation 412, the provider's client device 120A may encrypt the provider's private key using a cryptographic key, such as a symmetric cryptographic key accessible via a PIN.

At operation 414, the provider client device 120A may send the encrypted provider private key (and, in some cases, the provider's public key) to the server 118.

At operation 416, the server 118 may store the encrypted provider private key and the provider public key. In some embodiments, the provider client device 120A may send one or more datasets 208 to the server 118, as described above in relation to FIG. 3.

Continuing to FIG. 4B, at operation 418, the requester client device 120B may generate a request for a dataset 208. In some embodiments, the request for a dataset 208 may include a request for one or more datasets 208 stored by the personal data sharing server 118. The request for a dataset 208 may include a request for one or more personal data values stored by one or more datasets 208. The request for the dataset 208 may include personal data criteria. For example, the request may include personal data criteria specifying current age and current city of residence.

At operation 420, the requester client device 120B may send the request to the server 118. The server 118 may receive the request, and the request manager 119 may perform one or more operations on the server 118 related to processing and responding to the request.

At operation 422, the request manager 119 may generate a public-private key pair for the request. Generating a public-private key pair for the request may include the request manager 119 generating a public-private key pair unique to the request and for use associated with the request. The public key for the request and the private key for the request may be referred to, herein, respectively as the "request public key" and the "request private key."

At operation 424, the request manager 119 may encrypt the request private key using the requester's public key (which the server 118 may have received as part of operation 406).

At operation 426, the request manager 119 may then encrypt the encrypted request private key using a server cryptographic key. In some embodiments, the server cryptographic key may include a symmetric cryptographic key known by the server 118. In some embodiments, the server cryptographic key may include a public key associated with the personal data sharing platform 110. This process of layered encryption (two or more layers of encryption) may be referred to, herein, as "cascade encryption." For instance, cascade encryption of the request private key can include the request private key being encrypted using the requester's public key and the resulting encrypted request private key then being encrypted using the server cryptographic key. In some embodiments, the request manager 119 may store the cascade-encrypted request private key in the cryptographic keys 114 of the data store 112.

At operation 428, the request manager 119 may determine that a dataset 208 provided by a user account of the platform 110 (e.g., the user account associated with the provider client device 120A) satisfies criteria (e.g., personal data criteria) specified in the request from the requester client device 120B. For example, where the request specifies the attributes 206 of current age and current city of residence, the request manager 119 may determine that a dataset 208 that was previously received from the provider client device 120A (e.g., in operation 308 of FIG. 3) includes an attribute-value pair 210 specifying an attribute 206 for current age and an attribute-value pair 210 specifying an attribute 206 for current city of residence.

At operation 430 in response to determining that the dataset 208 satisfies the personal data criteria, the server 118 may send the encrypted dataset 208, the requester public key, and the request public key to the provider client device 120A. In one or more embodiments, multiple datasets 208A-K provided by the provider client device 120A, may satisfy criteria specified in the request. In such a case, the server 118 may send multiple encrypted datasets 208A-K to the provider client device 120A in operation 430.

At operation 432, in some embodiments, the provider client device 120A may request the encrypted provider private key from the server 118.

At operation 434, the server 118 may send the encrypted provider private key to the provider client device 120A.

At operation 436, the provider client device 120A may decrypt the encrypted provider private key responsive to the user of the provider client device 120A entering the PIN. In other embodiments, the provider client device 120A may use the encrypted provider private key stored at the provider client device 120A or other device associated with provider client device 120A (e.g., and not request the encrypted provider private key from personal data sharing platform 110).

Continuing in FIG. 4C, at operation 438, the provider client device 120A may decrypt the received encrypted dataset(s) 208. This may include decrypting the personal data values in the dataset's/datasets' 208 attribute-value pairs 210 that were previously encrypted using the provider's public key (e.g., as was done in operation 304 of FIG. 3).

At operation 440, the provider client device 120A may then encrypt the personal data values using the requester's public key, in some embodiments.

At operation 442, the provider client device 120A may then encrypt the encrypted personal data values using the request public key, in some embodiments. In some embodiments, the provider client device 120A may generate a second dataset 208 that includes the cascade-encrypted personal data values.

At operation 444, the provider client device 120A can send the encrypted dataset, such as the cascade-encrypted second dataset 208, to the server 118. It should be noted that in some embodiments, the second dataset 208 generated by the provider client device 120A and sent to the server 118 in operation 444 may include attributes 206 that do not conform to a dataset type 204 already stored in the datasets 115 of the data store 112. The second dataset 208, in some embodiments, may only include attribute-value pairs 210 whose attributes 206 are specified in the request from the requesting client device 120B (i.e., the request of operations 418 and 420). Thus, the attributes 206 of the second dataset 208 may include a subset of the attributes 206 of the one or more first datasets 208 sent to the provider client device 120A in operation 430.

At operation 446, the server 118 may receive an indication that a value item was transferred from the requester user associated with the requester client device 120B to the provider user associated with the provider client device 120A. For example, a transaction may occur on the personal data sharing platform 110 where the requester user account sends a cryptographic currency to the provide user account, and the transaction may generate the indication in the form of a notification or message or entry to a public ledger. In another embodiment, the server 118 may receive a notification from the third-party platform 130 via an API indicating that the requester user provided a value item to the provider user on the third-party platform 130. For example, the third-party platform 130 may include a mobile value item service platform, and the third-party platform 130 may send a notification to the server 118 indicating that the requester user sent a value item to the provider user on the third-party platform 130 using the users' respective third-party platform 130 user accounts.

At operation 448, responsive to receiving the indication, the request manager 119 may use a server cryptographic key to partially decrypt the cascade-encrypted request private key. Partially decrypting the cascade-encrypted request private key may include decrypting an outer layer of the cascade-encrypted request private key to generate the encrypted request private key (e.g., the inner layer is the request private key encrypted using the requester private key, and the outer layer is the encrypted request private key encrypted using the server cryptographic key). In some embodiments, e.g., where the server cryptographic key in operation 426 was a symmetric cryptographic key, the server cryptographic key may include the symmetric cryptographic key previously used to encrypt the encrypted request private key. In other embodiments, e.g., where the server cryptographic key in operation 426 was a public key associated with the platform 110, the server cryptographic key may include a private key that corresponds to the public key previously used in operation 426 to encrypt the encrypted request private key.

At operation 450, the server 118 may then send (1) partially decrypted information for obtaining the request private key, such as the partially decrypted request private key, and (2) the encrypted dataset 208, such as the cascade-encrypted second dataset 208 to the requester client device 120B.

As also seen in FIG. 4C, at operation 452, the requester client device 120B may request the encrypted requester private key from the server 118.

At operation 454, responsive to the request at operation 452, the server 118 may send the encrypted requester private key to the requester client device 120B for decryption using the requester private key.

At operation 456, the requester may then enter the requester's PIN into the requester client device 120B to access the symmetric cryptographic key and decrypt the encrypted requester private key. In some embodiments, the encrypted requestor private key may be stored local to the requestor client device 120B or at another device associated with the requestor client device 120B.

At operation 458, the requester client device 120B may use the decrypted requester private key to decrypt the partially encrypted request private key.

At operation 460, the requester client device 120B may use the request private key to partially decrypt the cascade-encrypted second dataset 208.

At operation 462, the requester client device 120B may use the requester private key to decrypt the partially decrypted encrypted second dataset 208 to obtain the personal data values of the provider in an unencrypted state. The requester may use the provider's personal data values as desired, e.g., combining the personal data values with the personal data values of other provider users and performing data analytics operations, etc.

As indicated above, some operations of the data flow 400 may be performed by other components of the system 100.

For example, operations 422, 424, and 426 may be performed by the requester client device 120B. In this case, the server cryptographic key of operation 426 may include a public key of the server 118. Also in this case, operation 420 may occur after operation 426 and may include the requester client device 120B sending the cascade-encrypted request private key to the server 118. In some embodiments, operations 422 and 424 may occur on the requester client device 120B, and operation 420 may include the requester client device 120B also sending the encrypted request private key to the server 118 so the server 118 can encrypt the encrypted request private key in operation 426.

In one embodiment, operations 432, 434, and 436 of FIG. 4B and operations 452, 454, and 456 of FIG. 4C may not occur (e.g., because the requester and provider have access to their respective private keys). In some embodiments, the provider client device 120A may not perform operation 440. Instead, the provider client device 120A may encrypt the first dataset 208 using the request public key only (operation 442). As a result, the requester client device 120B may not perform operation 462 and, instead, may decrypt the encrypted first dataset 208 using the request private key (which the requester client device 120B finished decrypting in operation 458). Other operations of the data flow 400 may be modified or not performed.

Figure 5:
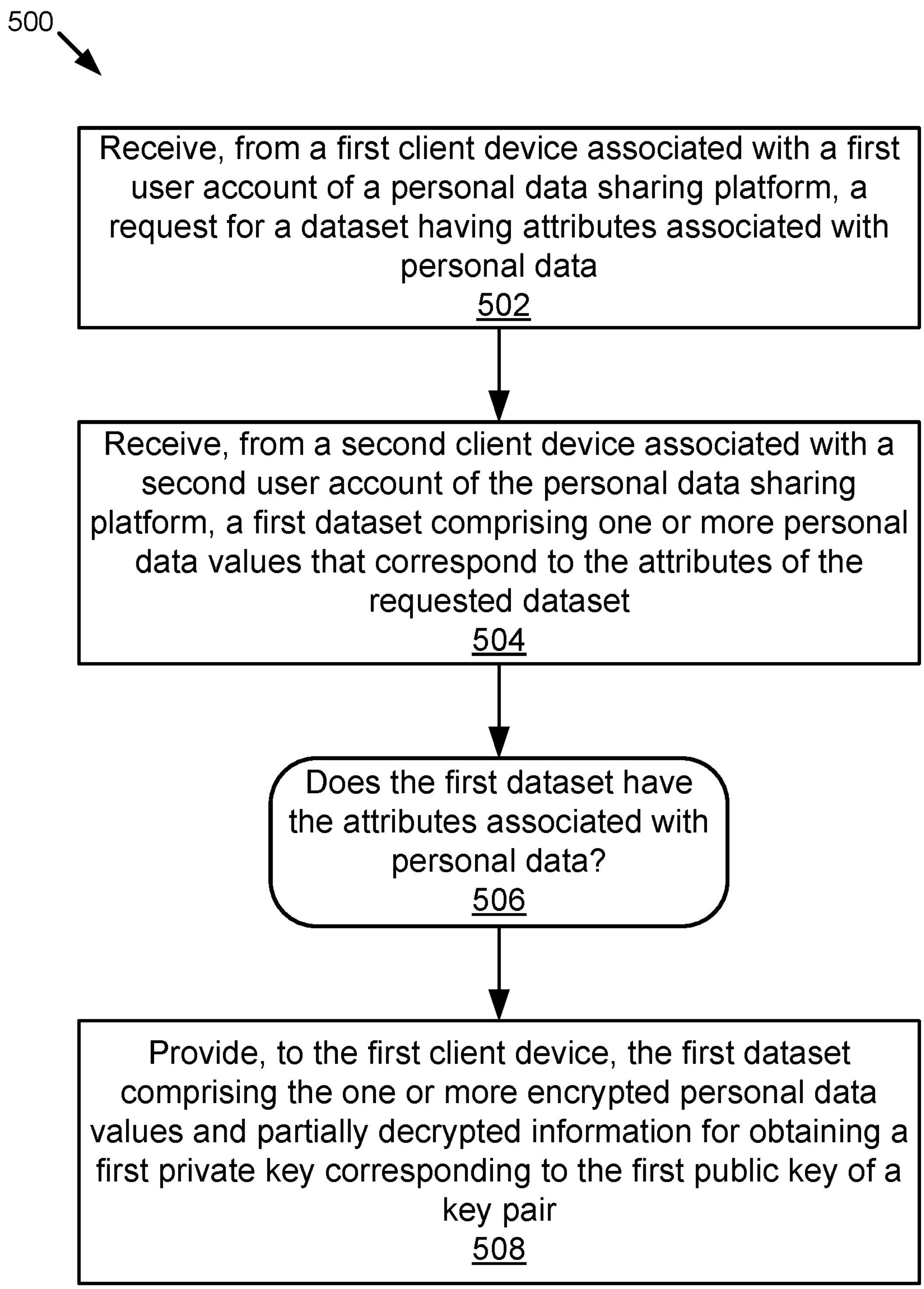
FIG. 5 is a flow diagram illustrating an example method for data encryption at a personal data sharing platform, in accordance with some embodiments of the disclosure.

FIG. 5 is a flow diagram illustrating an example method 500 for data encryption at a personal data sharing platform, in accordance with some embodiments of the disclosure. The method 500 may include a method for data encryption at a personal data sharing platform. The method 500, or its individual functions, routines, subroutines, or operations can be performed by a processing device, having one or more processing units (CPUs) and memory devices communicatively coupled to the CPU(s). In some embodiments, the method 500 can be performed by a single processing thread or alternatively by two or more processing threads, each thread executing one or more individual functions, routines, subroutines, or operations of the methods. The method 500, as described below, can be performed by processing logic that can include hardware (e.g., a processing device, circuitry, dedicated logic, programmable logic, microcode, hardware of a device, integrated circuit, etc.), software (e.g., instructions run or executed on a processing device), or a combination thereof. In some embodiments, the method 500 may be performed by one or more of the personal data sharing server 118 or the request manager 119, described in FIG. 1. Although shown in a particular sequence or order, unless otherwise specified, the order of the operations can be modified. Thus, the illustrated embodiment should be understood only as an example, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It may be noted that elements of FIG. 1 or FIG. 2, or operations described in relation to FIG. 3, or FIGS. 4A-C, may be used herein to help describe FIG. 5.

At operation 502, processing logic receives, from a first client device associated with a first user account of a personal data sharing platform, a request for a dataset having attributes associated with personal data. The first client device may include the requester client device 120B. The first user account may include the requester user's user account on the personal data sharing platform. The request for the dataset may include the request of operation 418 of FIG. 4B. Receiving the request in operation 502 may include receiving the request sent by operation 420.

At operation 504, processing logic receives, from a second client device associated with a second user account of the personal data sharing platform, a first dataset. The first dataset may include one or more personal data values that correspond to the attributes of the requested dataset. The one or more personal data values may have been encrypted using at least a first public key. The second client device may include the provider client device 120A. The second user account may include the provider user's user account on the personal data sharing platform. The first dataset may include the encrypted dataset 208 sent by the provider client device 120A in operation 444 of FIG. 4C. The first public key may include the request public key. As shown in operations 440 and 442, the first dataset may have been encrypted by the provider client device 120A using the requester public key, and then the resulting encrypted first dataset may have been encrypted using the request public key.

In some embodiments, each personal data value of the one or more personal data values of the first dataset may be individually encrypted using the first public key. In some embodiments, the first dataset may further include the attributes associated with personal data in an unencrypted state. For example, as described above, in operation 442, the provider client device 120A may encrypt the personal data values (which may have already been encrypted in operation 440) using the request public key and may include the encrypted personal data values in the encrypted second dataset 208. The encrypted second dataset 208 may include attributes 206 that are unencrypted in the second dataset's 208 attribute-value pairs 210.

At operation 506, processing logic may determine whether the first dataset has the attributes associated with personal data specified in the request of operation 502. If so, at operation 508, processing logic provides, to the first client device, the first dataset, which includes the one or more encrypted personal data values and partially decrypted information for obtaining a first private key corresponding to the first public key of a key pair. In some embodiments, the first private key may be configured to at least partially decrypt the one or more encrypted personal data values.

In some embodiments, the first dataset may include the encrypted second dataset 208 of operation 444 of FIG. 4C. Providing the first dataset to the first client device may include the server 118 sending the encrypted second dataset 208 to the requester client device 120B in operation 450. In some embodiments, the partially decrypted information for obtaining the first private key may include the encrypted request private key that the requester client device 120B can decrypt using the requester private key in operation 458. The first private key may include the request private key.

In one embodiment, responsive to receiving the request for the dataset, processing logic may generate the first public key and the first private key. This may include the request manager 119 generating the public-private key pair for the request in operation 422 in FIG. 4B. In some embodiments, processing logic may provide the first public key to the second client device. The second client device may be associated with the second user account. Providing the first public key to the second client device may include the server 118 sending the request public key to the provider client device 120A in operation 430.

In one or more embodiments, processing logic may provide the first dataset to the first client device responsive to receiving, at the personal data sharing platform, an indication that a value item was transferred from a user associated with the second user account to a user associated with the first user account. This may include the server 118 receiving an indication that a value item was transferred from the requester to the provider in operation 446 of FIG. 4C.

In some embodiments, processing logic may further include encrypting the first private key with a second public key. The second public key and a second private key may be associated with the first user account. The second public key and the second private key may include the public and private key associated with the requester user account, which were generated in operation 402 of FIG. 4A. Encrypting the first private key with the second public key may include the server 118 encrypting the request private key with the requester's public key in operation 424 of FIG. 4B. Processing logic may then encrypt the encrypted first private key using a personal data sharing platform key in order to generate a cascade-encrypted first private key. This may include the server 118 encrypting the encrypted request private key using a server cryptographic key in operation 426. The server cryptographic key may include a symmetric key associated with the personal data sharing platform or may include a public key associated with the personal data sharing platform. In some embodiments, providing the partially decrypted information for obtaining the first private key to the first client device may include processing logic decrypting an outer layer of the cascade-encrypted first public key and providing the encrypted first private key to the first client device for decryption using the second private key. This may include the server 118 decrypting the cascade-encrypted request private key in operation 448 of FIG. 4C and then sending the partially decrypted request private key to the requester client device 120B in operation 450.

In some embodiments, the data flow 400 and the method 500 may provide a personal data sharing platform where users of the platform can exchange personal data without the platform's 110 server 118 having access to the personal data in an unencrypted state, which may increase the data security of the platform over conventional systems. In some embodiments, the personal data sharing platform disclosed herein in may accomplish this by at least in part receiving encrypted datasets 208 from provider client devices 120A, generating request private and public keys for requests for personal data, sending the encrypted datasets 208 to their respective provider client device's 120A for decryption and re-encryption, and the requester client device 120B being able to decrypt the personal data values using the request private key.

As discussed above, another technical problem addressed by embodiments of the disclosure is the secure determination of personal data that satisfies one or more request criteria. A technical solution may include the encrypted personal data evaluation structures and processes, discussed below, that allow for the determination of whether encrypted personal data satisfies criteria in a request without decrypting the personal data.

Figure 6A:
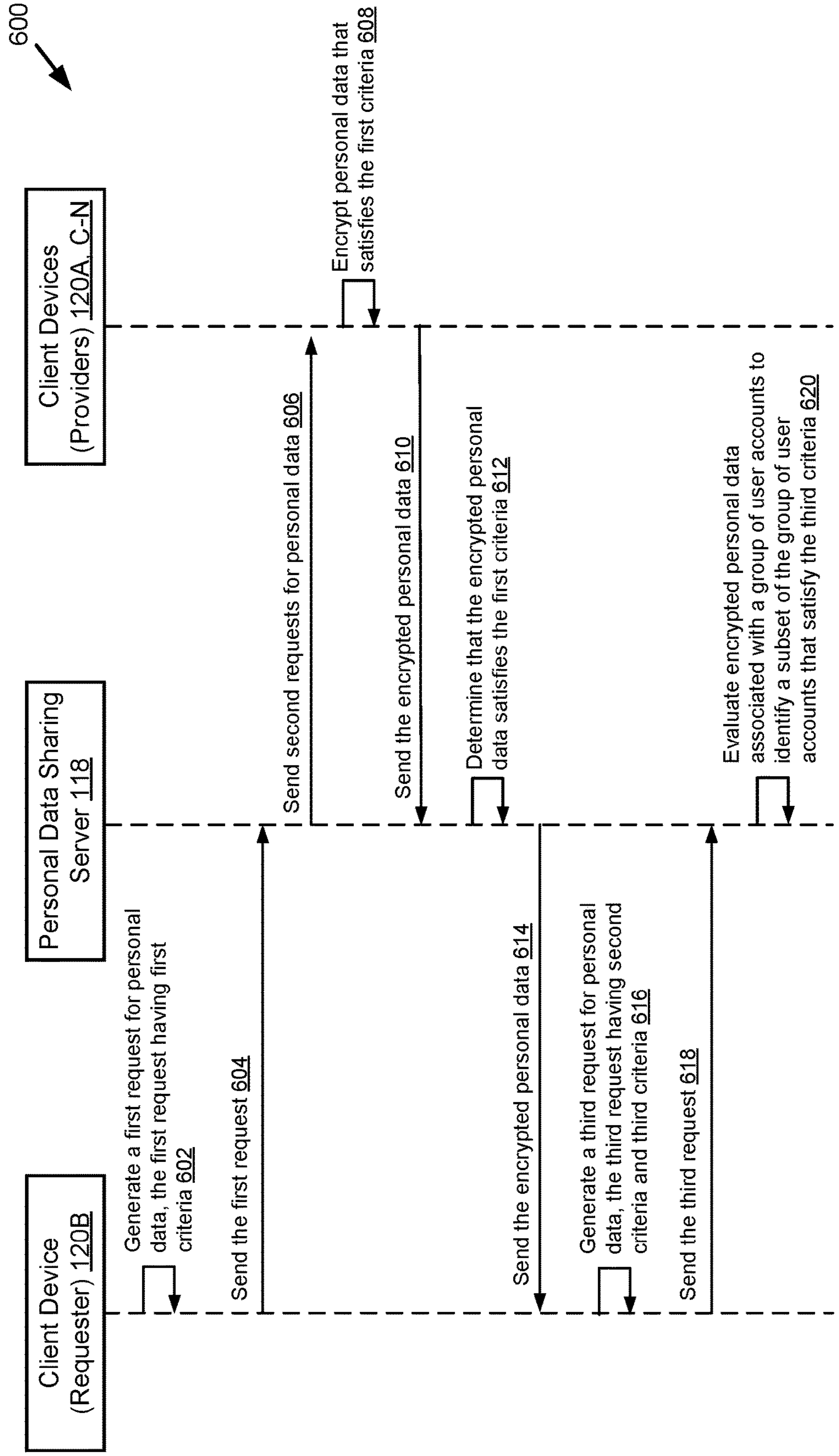
FIG. 6A is a sequence diagram illustrating an example flow of data for identifying user account groupings at a personal data sharing platform, in accordance with some embodiments of the disclosure.
Figure 6B:
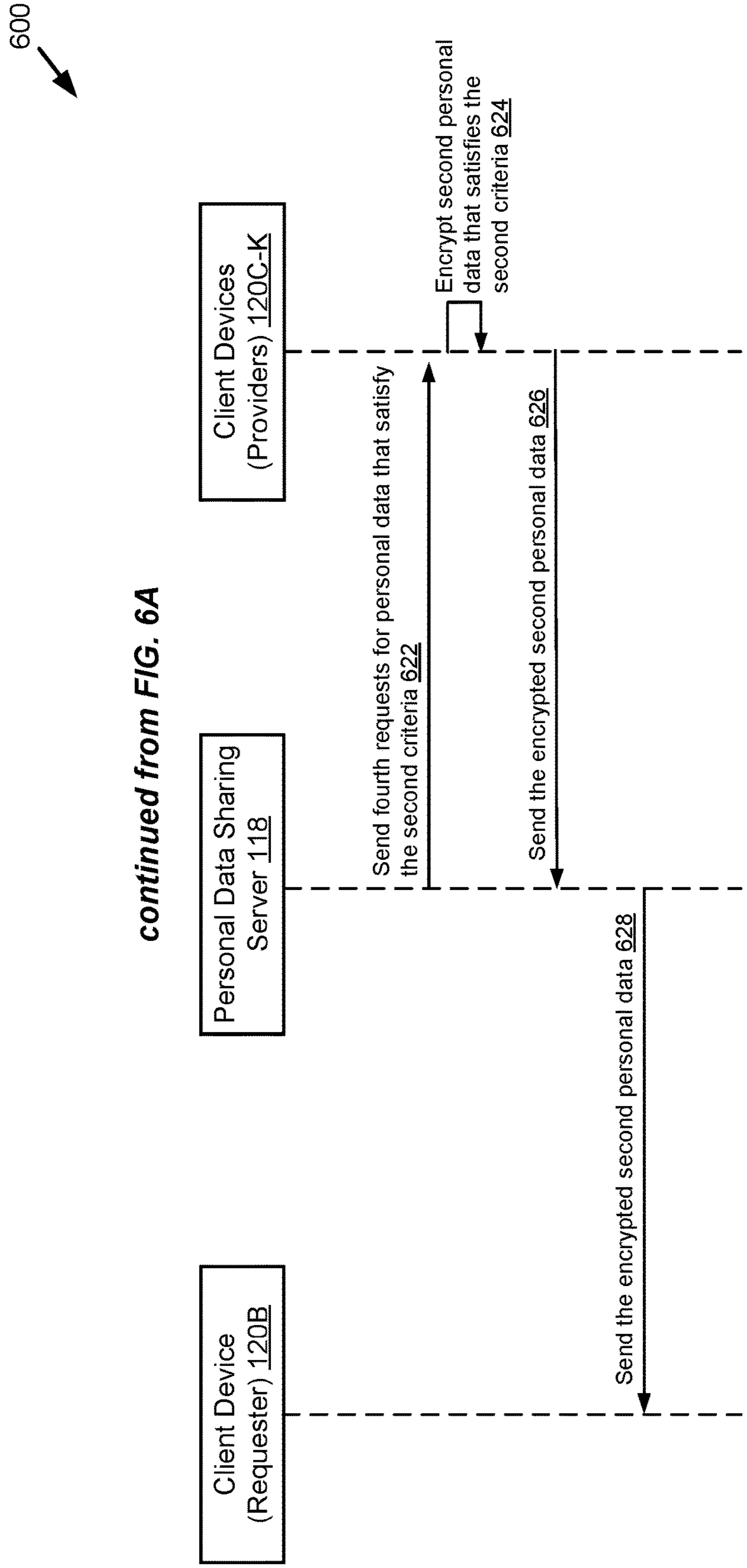
FIG. 6B is a sequence diagram illustrating a continuation of the flow of data in FIG. 6A, in accordance with some embodiments of the disclosure.

FIGS. 6A-6B show a sequence diagram illustrating an example flow of data for identifying user account groupings at a personal data sharing platform 110, in accordance with some embodiments of the disclosure. The operations described with respect to FIGS. 6A-B are shown to be performed serially for the sake of illustration, rather than limitation. It may be noted that in some embodiments the operations may be performed in any order or may be performed one or more times. In some embodiments, some operations may be omitted or may include the same or additional operations. In some embodiments, the one or more operations of a particular data flow (e.g., data flow 600) can be combined with one or more operations of one or more other data flows (e.g., data flow 300 and/or data flow 400). In some embodiments, the operations illustrated as being performed by client devices 120A-120N may be performed by respective applications (e.g., application 122A through application 122N). In some embodiments, operations illustrated as being performed by personal data sharing platform 110 may be performed by request manager 119. In some embodiments, one or more components of the system 100 of FIG. 1 may perform one or more of the operations of the data flow 600.

In FIG. 6A, at operation 602, the data flow 600 may begin, and the requester client device 120B may generate a first request for personal data. The first request may include first criteria (e.g., personal data criteria). The first criteria may relate to personal data. The first criteria may specify one or more attributes 206 for which the requester is requesting personal data values.

At operation 604, the requester client device 120B may send the first request to the server 118. In some embodiments, operation 602 may include operation 418 of FIG. 4B, and operation 604 may include operation 420 of FIG. 4B.

The personal data sharing server 118 may receive the request. The request manager 119 may process the request and may determine one or more user accounts of the personal data sharing platform to which to send second requests for personal data based on the first request. In one embodiment, determining the one or more user accounts may include the request manager 119 determining the user accounts based on criteria in the first request (e.g., the first request may include an attribute 206 and a corresponding personal data value, indicating that the second requests should be sent to user accounts that previously provided a dataset 208 with the same attribute 206 and corresponding personal data value in a attribute-value pair 210). In some embodiments, determining the one or more user accounts may include the request manager 119 selecting one or more user accounts that may provide the requested personal data values. In other embodiments, the personal data sharing platform 110 may select all the user accounts (e.g., broadcast) from which to request personal data that satisfied the personal data criteria.

At operation 606, the server 118 may send second requests for personal data to the provider client device(s) 120A, C-N. The provider client devices 120A, C-N may receive the respective second requests and may display the second request on their respective UIs. In some embodiments, the second request identify the personal data criteria (e.g., identify the requested attributes).

At operation 608, the provider users of the provider client devices 120A, C-N may decide whether to send personal data in response to the second request. The providers that decide to respond to the second requests may encrypt personal data that satisfies the first criteria.

At operation 610, the provider client devices 120A, C-N that respond to the second request can send the encrypted personal data to the server 118.

In some embodiments, the personal data that satisfies the first criteria may already be stored in one or more datasets 208 of the datasets 115 of the data store 112. The server 118 may send the one or more encrypted datasets 208 to the associated provider client device 120A so the provider client device 120A can decrypt the personal data and re-encrypt the personal data using a request public key associated with the first request (as described above in relation to operations 438-442 of FIG. 4C). In some embodiments, a provider may enter the personal data into the application 122A of the provider's client device 120A, and the provider client device 120A may generate a dataset 208 that includes the personal data. The provider client device 120A may encrypt the personal data as described above in relation to operations 440-442. The provider client device 120A may send a dataset 208 with the encrypted personal data to the server 118 in operation 612. In one embodiment, the server 118 may receive the encrypted personal data.

At operation 612, the request manager 119 may determine that the encrypted personal data satisfies the first criteria. In some embodiments, determining that the that the encrypted personal data satisfies the first criteria, may include the request manager 119 determining that the dataset 208 received in operation 610 includes a hash value or ciphertext in the attribute-value pairs 210. In some embodiments, having either a hash value or ciphertext for a corresponding attribute can indicate that the provider client device 120A, C-N that provided the dataset 208 provided the requested personal data values.

At operation 614, the request manager 119 may send the encrypted personal data to the requester client device 120B. For example, as described above, the encrypted personal data may include one or more encrypted datasets 208, and operation 614 may include the server 118 sending the one or more encrypted datasets 208 to the requester client device 120B. The server 118 may also send information used to decrypt the one or more encrypted datasets 208 (e.g., the partially decrypted request private key of operation 450 of FIG. 4C). The requester client device 120B may then decrypt the personal data (e.g., as described above in operations 459-462 of FIG. 4C). The requester user may then view the unencrypted personal data, perform operations on the personal data, or make decisions based on the personal data.

At operation 616, the request client device 120B may generate a third request for personal data. Similar to the first request in operation 602, the third request may include second criteria (e.g., personal data criteria) related to the personal data. The third request may include third criteria (e.g., provider criteria) that relates to characteristics that qualify user accounts for providing the personal data.

In one embodiment, the second criteria (e.g., personal data criteria) may identify one or more inquires requesting personal data. For example, the inquiry can include a question such as "How many COVID shots have you had in the last 12 months?" In some embodiments, an attribute 206 can include an inquiry. The second criteria may include attributes 206 for which the requester would like personal data from other personal data sharing platform users. The second criteria may include other data requesting personal data. In some embodiments, the third criteria (e.g., provider criteria) may include data indicating one or more characteristics of user accounts from which the requester would like personal data. For example, the requestor may wish to seek personal data from providers that have not had any COVID shots in the past 12 months. In some embodiments, the one or more characteristics may be determined from user account information, user account configuration information, user account preferences, or information from the user accounts 113 of the data store 112. In some embodiments, the one or more characteristics may be determined from a dataset 208 provided by a user account and stored in the datasets 115 of the data store 112.

At operation 618, the requester client device 120B may send the third request to the server 118.

At operation 620, the request manager 119 of the server 118 may evaluate encrypted personal data associated with a group of user accounts to identify a subset of the group of user accounts that satisfy the third criteria (e.g., provider criteria). In some embodiments, the encrypted personal data may include encrypted personal data values stored in attribute-value pairs 210 of a dataset 208 that is stored in the datasets 115 of the data store 112. Because the personal data stored in a dataset 208 may be encrypted, the request manager 119 may not be able to directly compare the personal data of the dataset 208 to the third criteria of the third request. However, because the dataset 208 may include hash values of the personal data, the request manager 119 may be able to recreate personal data values using the third criteria of the third request and infer the value of the encrypted personal data values. Thus, in some embodiments, evaluating the encrypted personal data may be performed without decrypting the encrypted personal data.

In one embodiment, the request manager 119 evaluating the encrypted personal data may include the request manager 119 generating a hash based on the third criteria. The request manager 119 may generate a hash of a value specified in the third criteria. If the hash of the value of the third criteria matches the hash stored in an attribute-value pair 210 of a dataset 208, then the request manager 119 can determine that the value in the third criteria matches the personal data value used to generate the hash stored in the attribute-value pair 210.

In some embodiments, as discussed above in relation to FIG. 2, when generating an encrypted personal data value that is stored in an attribute-value pair 210 of a dataset 208, data in addition to the personal data value may be input into the hash function. For example, as discussed above in relation to FIG. 2, a user identifier, an attribute identifier, and the personal data value may be concatenated together and input into the hash function to generate the encrypted personal data value for an attribute-value pair 210. Similarly, when the request manager 119 evaluates encrypted personal data in operation 620, the request manager 119 may use a user identifier and an attribute identifier in addition to the personal data value from the third criteria (e.g., provider criteria) as input to a hash function. The request manager 119 may retrieve the user identifier from the user accounts 113 of the data store 112. The request manager 119 may retrieve the attribute identifier from the datasets 115 of the data store 112.

In one or more embodiments, the ciphertext of an attribute-value pair 210 of a dataset 208 may have been generated using homomorphic encryption. Homomorphic encryption may allow computations or operations to be performed on the ciphertext without decrypting the ciphertext. In some embodiments, the request manager 119 evaluating the encrypted personal data may include the request manager 119 using one or more operations to evaluate the ciphertext to determine whether a user account associated with the ciphertext satisfies the third criteria and, thus, belongs in the subset of the group of user accounts.

For example, in one embodiment, the request manager 119 may execute an operation on the ciphertext of an attribute-value pair 210 of a first dataset 208. The operation may be compatible with homomorphic encryption. The operation may accept, as input, a value from the third criteria and the ciphertext. The operation may generate an output indicating whether the ciphertext satisfies the third criteria. Responsive to the operation indicating the ciphertext satisfies the third criteria, the request manager 119 may identify the user account that provided the first dataset 208 and may include the user account in the subset of the group of user accounts.

In another example and in some embodiments, a public and private key pair for homomorphic encryption can be generated. The key pair can be generated at the personal data sharing platform 110 or at a client device, such as the provider client device 120A. At the provider client device 120A each of the personal data values can be encrypted using a homomorphic encryption scheme. A homomorphic encryption scheme can include one or more of partially homomorphic or fully homomorphic encryption. Some example schemes can include Paillier, ElGamal, Brakerski-Fan-Vercauteren (BFV), Cheon, Kim, Kim, and Song (CKKS), among others. For instance, each of the personal data values (or some combination of data that includes the personal data values, as described herein) can be encrypted using the public key (e.g., homomorphic public key). An encrypted dataset 208 including the encrypted data values (e.g., ciphertext) and, in some cases, the corresponding attributes 206 and/or public key can be sent to the personal data sharing platform 110. In some embodiments, the personal data sharing platform 110 can use the public key to encrypt one or more estimated personal data values (or some combination of data that includes the personal data values) to generate ciphertext. In some embodiment, a homomorphic operation (e.g., homomorphic equality testing, zero-knowledge proofs for equality testing, etc.) can be used to determine whether the one or more ciphertext generated by the personal data sharing platform 110 and respective one or more ciphertext representing personal data values of the dataset 208 satisfy a condition (e.g., determine whether two respective ciphertexts are equal). If the condition is satisfied, the personal data sharing platform 110 can infer the personal data value, which can be used to determine whether the provider criteria is satisfied. It can be noted that homomorphic encryption and hash function encryption is described herein with respect to provider criteria for the sake of illustration, rather than limitation. In other embodiments, homomorphic encryption and or hash value encryption can be implemented in other operations, such as determining whether the personal data criteria is satisfied.

In some embodiments, the group of user accounts of operation 620 may include the user accounts associated with the provider client devices 120A, C-N that responded to the second requests for personal data in operation 606. The request manager 119 may identify a subset of these user accounts whose personal data satisfy the third criteria, as determined by the request manager 119 evaluating datasets 208 provided by such user accounts (operation 620).

Continuing the data flow 600 in FIG. 6B, at operation 622, the server 118 may send fourth requests for personal data to the provider client devices 120C-K associated with the subset of user accounts identified in operation 620. The fourth requests may include requests for personal data that satisfy the second criteria of the third request.

At operation 624, the provider users associated with the provider client devices 120C-K may decide whether to send personal data in response to the fourth request. The provider users that decide to respond to the fourth requests may encrypt second personal data that satisfies the second criteria.

At operation 626, provider client devices 120C-K can send the encrypted second personal data to the server 118.

In some embodiments, the second personal data that satisfies the second criteria (e.g., personal data criteria) may already be stored in one or more datasets 208 of the datasets 115 of the data store 112. The server 118 may send the one or more encrypted datasets 208 to the associated provider client device 120C so the provider client device 120C can decrypt the personal data and re-encrypt the personal data using a request public key associated with the first request (as described above in relation to operations 438-442 of FIG. 4C). In some embodiments, a provider user may enter the second personal data into the application 122C of the provider's client device 120C, and the provider client device 120C may generate a dataset 208 that includes the second personal data. The provider client device 120C may encrypt the second personal data as described above in relation to operations 440-442. The provider client device 120C may send a dataset 208 with the encrypted second personal data to the server 118 in operation 626. In one embodiment, the server 118 may receive the encrypted second personal data.

At operation 628, the request manager 119 may send the encrypted second personal data to the requester client device 120B. For example, as described above, the encrypted second personal data may include one or more encrypted datasets 208, and operation 628 may include the server 118 sending the one or more encrypted datasets 208 to the requester client device 120B. The server 118 may also send information used to decrypt the one or more encrypted datasets 208 (e.g., the partially decrypted request private key of operation 450 of FIG. 4C). The requester client device 120B may then decrypt the second personal data (e.g., as described above in operations 458-462 of FIG. 4C). The requester may then view the second personal data, perform operations on the second personal data, or make decisions based on the second personal data.

As an example of the data flow 600, at operation 602, the requester client device 120B may generate a first request for personal data, and the first request may include first criteria (e.g. personal data criteria). The first criteria may include a user's current age and a user's current city of residence. The requester client device 120B may send the first request to the server 118 in operation 604. The request manager 119 may determine one or more user accounts to which to send the second requests. In this case, since the first request did not specify any attributes or other criteria, the request manager 119 may select one or more user accounts of the platform. The request manager 119 may generate a second request based on the first criteria of the first request. For example, the request manager 119 may generate a second request specifying two attributes 206: a first attribute 206 for current age and a second attribute 206 for current city of residence. At operation 606, the server 118 may send copies of the second request to multiple provider client devices 120A, C-N. Each provider client device 120A, C-N may display the second request on a UI, asking the provider user if the user would like to respond to the request and provide the requested personal information. Multiple provider users may respond by entering their current ages and current cities of residence into their respective provider client devices 120A, C-N. At operation 608, the provider client devices 120A, C-N may each encrypt the entered age and current city of residence and generate a dataset 208. The dataset 208 may include two attribute-value pairs 210: a first attribute-value pair 210 that includes a "current age" attribute 206 and the corresponding age personal data value in an encrypted state, and a second attribute-value pair 210 that includes a "current city of residence" attribute 206 and the corresponding city of residence personal data value in an encrypted state. The multiple provider client devices 120A, C-N may send their respective datasets 208 with the encrypted personal data to the server 118 in operation 610.

At operation 612, the request manager 119 may determine that the encrypted personal data received in operation 610 satisfies the first criteria. In this example, this may include the request manager 119 determining that each dataset 208 received in operation 610 includes two attribute-value pairs 210: a first attribute-value pair 210 that includes a "current age" attribute 206 and a corresponding age personal data value in an encrypted state, and a second attribute-value pair 210 that includes a "current city of residence" attribute 206 and a corresponding city of residence personal data value in an encrypted state. The server 118 may send the datasets 208 to the requester client device 120B in operation 614. The requester client device 120B may decrypt the personal data to obtain the current ages and cities of residence of the responding provider users.

Continuing the example, the requester user may want more personal data from users who are 35 years old and currently live in Columbus, Ohio, United States. The requester client device 120B may then generate a third request for personal data in operation 616. The third request may include second criteria and third criteria. The second criteria (e.g., personal data criteria) may include a question asking if the user is familiar with a certain product. The third criteria (e.g., provider criteria) may include criteria specifying the age of 35 and specifying the current city of residence of Columbus, Ohio, United States. The requester client device 120B may then send the third request to the server 118 in operation 618. The server 118 may receive the third request, and at operation 620, the request manager 119 may evaluate encrypted personal data associated with the group of user accounts that responded to the second requests. The request manager 119 may identify, from the encrypted personal data provided by the group of user accounts associated with the provider client devices 120A, C-N, a subset of the user accounts that provided data indicating an age of 35 and a current city of residence of Columbus, Ohio, United States. The request manager 119 may send a fourth request to the client devices 120C-K associated with the subset of user accounts (operation 622). The fourth request may include the second criteria, i.e., a question asking if the user is familiar with a certain product. The provider client devices 120C-K of the provider users that decide to answer the question may encrypt the responsive personal data (which may include a value of "yes" or "no") (operation 624) and send the encrypted personal data to the server (operation 626). The server 118 may send the encrypted personal data to the requester client device 120B in operation 628, and the requester client device 120B may decrypt the personal data values for use by the requester user.

Figure 7:
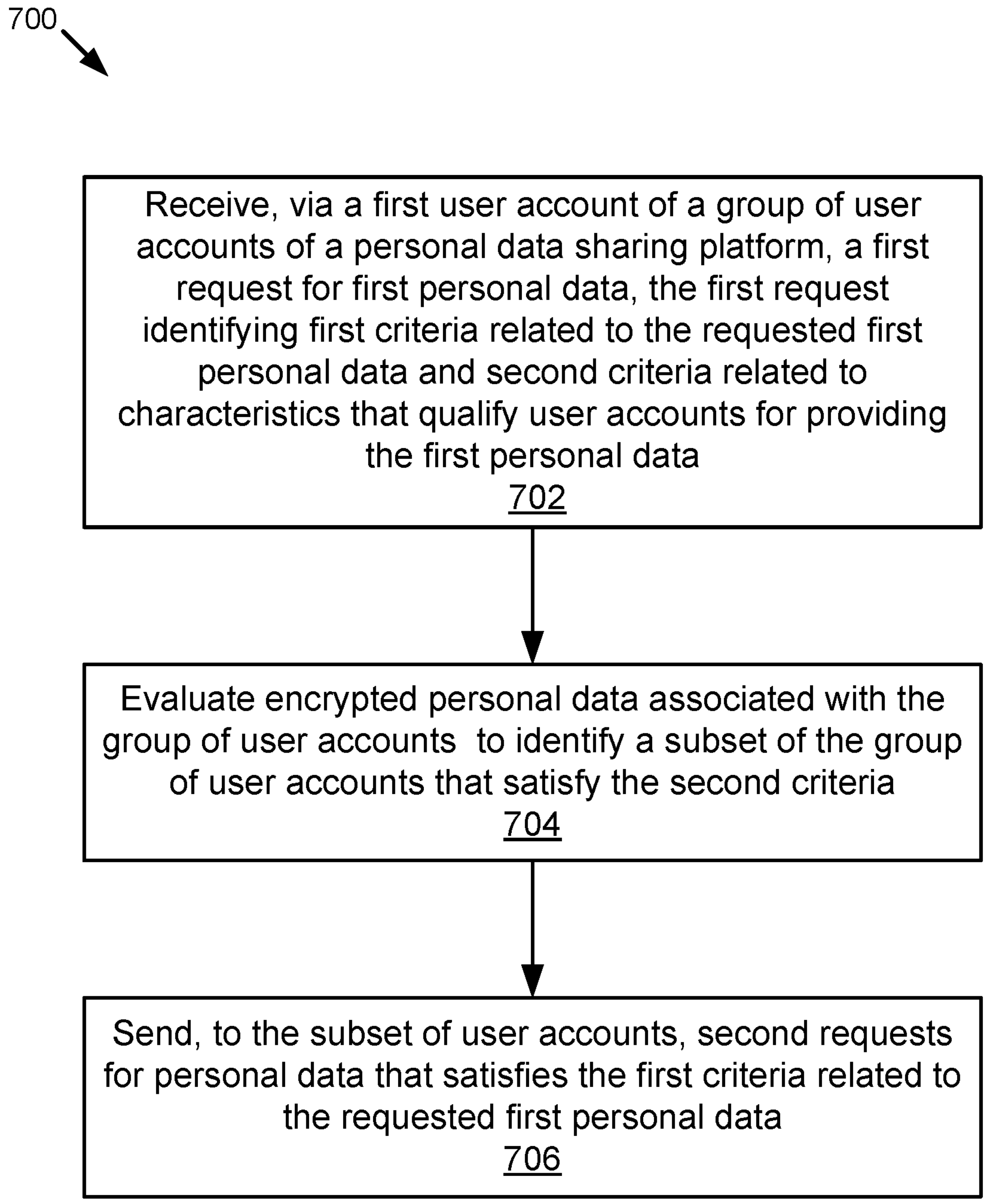
FIG. 7 is a flow diagram illustrating an example method for identifying user account groupings at a personal data sharing platform, in accordance with some embodiments of the disclosure.

FIG. 7 is a flow diagram illustrating an example method 700 for identifying user account groupings at a personal data sharing platform, in accordance with some embodiments of the disclosure. The method 700, or its individual functions, routines, subroutines, or operations can be performed by a processing device, having one or more CPUs and memory devices communicatively coupled to the CPU(s). In some embodiments, the method 700 can be performed by a single processing thread or alternatively by two or more processing threads, each thread executing one or more individual functions, routines, subroutines, or operations of the methods. The method 700, as described below, can be performed by processing logic that can include hardware (e.g., a processing device, circuitry, dedicated logic, programmable logic, microcode, hardware of a device, integrated circuit, etc.), software (e.g., instructions run or executed on a processing device), or a combination thereof. In some embodiments, the method 700 may be performed by one or more of the personal data sharing server 118 or the request manager 119. Although shown in a particular sequence or order, unless otherwise specified, the order of the operations can be modified. Thus, the illustrated embodiment should be understood only as an example, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It may be noted that elements of FIG. 1, FIG. 2, or FIGS. 6A-B may be used herein to help describe FIG. 7.

At operation 702, processing logic receives, via a first user account of a group of user accounts of a personal data sharing platform, a first request for first personal data. The first request may identify first criteria related to the requested first personal data and second criteria related to characteristics that qualify user accounts for providing the first personal data. In some embodiments, the first user account may include a requester user account associated with the requester client device 120B. The first request for first personal data in operation 702 may include the third request of operations 616 and 618 of FIG. 6A. The first criteria of operation 702 may include the second criteria discussed above in relation to operation 616, and the second criteria of operation 702 may include the third criteria discussed above in relation to operation 616.

In one embodiment, the first criteria of operation 702 may identify one or more inquires for the requested first personal data. For example, the first criteria may include questions provided by the requester user for which the requester user would like corresponding personal data values as answers to the questions.

In some embodiments, prior to receiving the first request of operation 702, processing logic may receive, via the first user account, a first previous request for second personal data. The first previous request may identify third criteria related to the second personal data. The first previous request may include the first request discussed above in relation to operations 602 and 604 of FIG. 6A. The second personal data may include the personal data provided by provider client devices 120A, C-N in operation 610, as discussed above. The third criteria may include the first criteria of the first request discussed in operation 602.

The processing logic may send, to multiple user accounts, a second previous request for personal data that satisfy the third criteria related to the requested second personal data. The multiple user accounts may include the user accounts associated with the provider client devices 120A, C-N in operation 606, discussed above. The second previous request may include the second requests for personal data discussed in operation 606. The processing logic may receive, from among the multiple user accounts, previous responses to the second previous request from the group of user accounts. The previous responses may include the encrypted personal data related to the third criteria. For example, as discussed above, the previous responses may include the encrypted personal data of operation 610. In some embodiments, responsive to receiving the first request in operation 702, the processing logic may identify the group of user accounts as the user accounts that provided the responses to the second previous request.

At operation 704, processing logic evaluates encrypted personal data associated with the group of user accounts to identify a subset of the group of user accounts that satisfy the second criteria. Evaluating the encrypted personal data may include the request manager 119 evaluating encrypted personal data as described above in relation to operation 620.

The subset of the user accounts may include the subset of user accounts discussed above in relation to operation 620.

In some embodiments, evaluating the encrypted personal data in operation 704 may be performed without decrypting the encrypted personal data. For example, as discussed above in relation to operation 620 of FIG. 6A, processing logic may, for each user account of the group of user accounts, identify respective encrypted personal data as part of one or more datasets 208 that each include one or more encrypted data values (e.g., as part of an attribute-value pair 210). The processing logic may, for each user account of the group, generate one or more hash values based on the second criteria of operation 702. Generating the one or more hash values based on the second criteria may include generating the one or more hash values using a hash function and data unique to the respective user account (e.g., an account identifier). The one or hash values may correspond to respective encrypted data values of the one or more encrypted data values. The processing logic may, for each user account of the group, determine whether the one or more hash values and the respective encrypted data values satisfy a condition. The condition may include a hash value derived from the second criteria and a hash value of the one or more encrypted data values matching. The hash values may match responsive to generating the hash values using the same hash function and using the same input. For example, the respective encrypted data values and the one or more hash values may be generated using a same hash function. Responsive to determining that the one or more hash values derived from the second criteria and the respective encrypted data values satisfy the condition, the processing logic may associate the respective user account with the subset of user accounts.

At operation 706, processing logic sends, to the subset of user accounts, second requests for personal data that satisfies the first criteria related to the requested first personal data. The second requests for personal data in operation 706 may include the fourth requests discussed above in relation to operation 622 of FIG. 6B.

In some embodiments, the encrypted personal data of operation 704 may include first encrypted personal data. The first encrypted personal data may include encrypted personal data previously received by the sever 110, e.g., the encrypted personal data of operation 610 of FIG. 6A. Processing logic may, responsive to sending the second requests for personal data in operation 706, receive responses to the second requests from one or more user accounts. The responses to the second requests may include second encrypted personal data related to third criteria. This may include the server 118 receiving the encrypted second personal data in operation 626 of FIG. 6B. The third criteria may include the first criteria specified in the first request of operation 702 or may include other criteria. The second encrypted personal data may include one or more attribute identifiers and one or more encrypted values corresponding to the one or more attribute identifiers. For example, as discussed above in relation to operation 624, the encrypted second personal data may include a dataset 208, which may include one or more attribute-value pairs 210, and each attribute-value pair 210 may include an attribute 206 and a corresponding personal data value. The personal data value may include an encrypted personal data value (e.g., a hash or a ciphertext of the personal data value).

In some embodiments, a first portion of the encrypted data values may be encrypted using a hash function, and a second portion of the encrypted data values may be encrypted using a cryptographic key. For example, as shown in FIG. 2, in the dataset 208, the encrypted data value of the attribute-value pair 210B may include a hash value generated using a hash function, and the encrypted data value of the attribute-value pair 210Y may include a ciphertext generated using an encryption function with a cryptographic key.

Thus, as can be seen above, aspects of the current disclosure may include personal data request structures and processes that are able to identify a subset of user accounts of the personal data sharing platform, even without decrypting the personal data, and send requests for personal data to the subset of client devices 120 as specified in criteria provided by a requesting user. In this manner, the server 118 does not send requests for personal data nor receiver personal data in an unencrypted state, which results in the personal data of user accounts of the platform being more secure. Furthermore, the server 118 may not send requests for data to a large amount of user accounts and receive large amounts of personal data to send to the requesting client device 120B, only for the requesting user to use a small fraction of such personal data. Instead, targeted requests for data are sent to subsets of user accounts, and the server 118 can identify the subsets even without decrypting such user accounts' personal data stored on the server 118.

Figure 8:
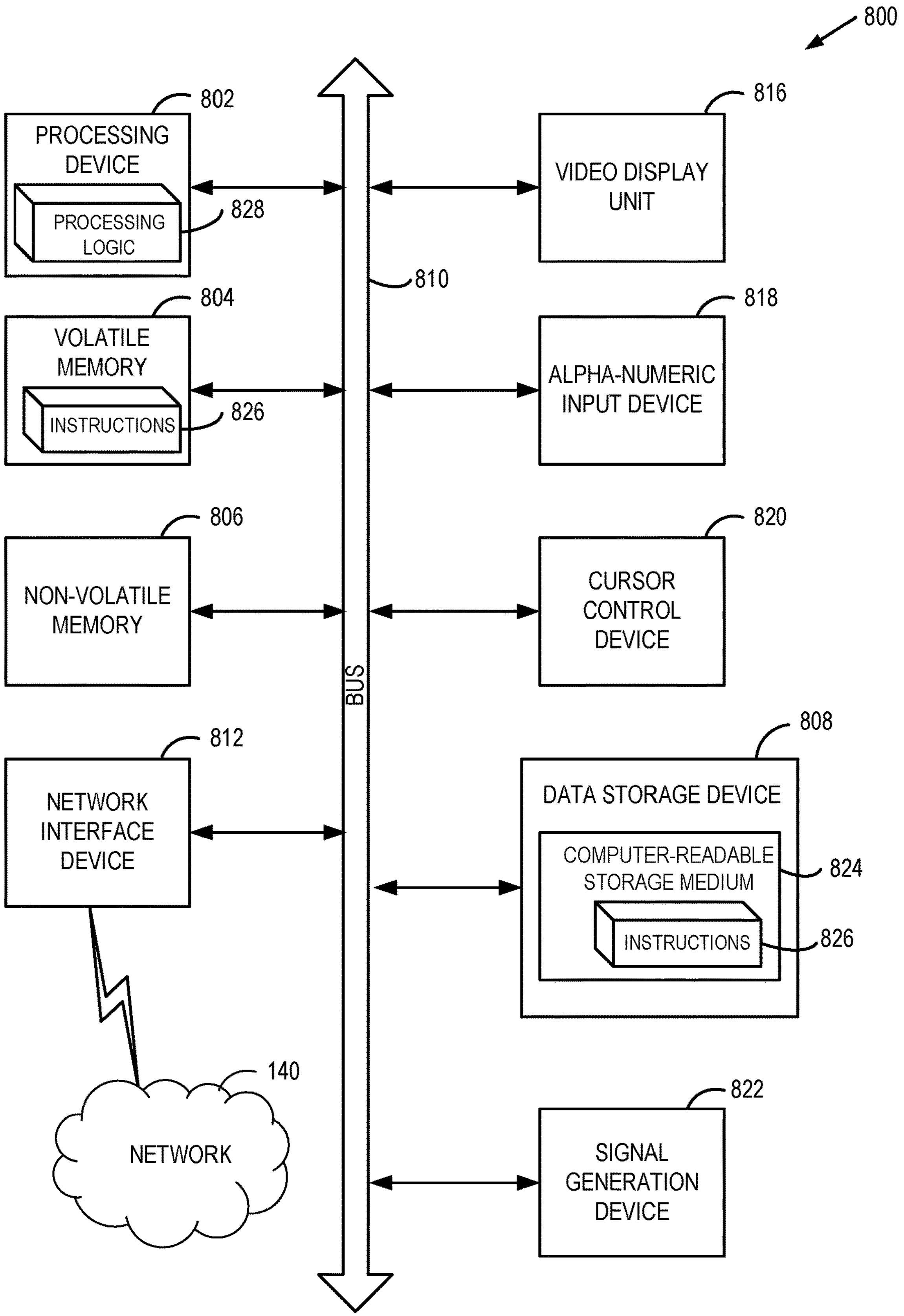
FIG. 8 is a block diagram illustrating an example computer system, in accordance with some embodiments of the disclosure.

FIG. 8 is a block diagram illustrating an example computer system 800, in accordance with some embodiments of the disclosure. The computer system 800 executes one or more sets of instructions that cause the machine to perform any one or more of the methodologies discussed herein. The terms "set of instructions," "instruction set," "instructions," and the like may refer to instructions that, when executed by computer system 800, cause the computer system 800 to perform one or more operations for data encryption at a personal data sharing platform or identifying user account groupings at a personal data sharing platform (e.g., perform operations of request manager 119). The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" may include any collection of machines that individually or jointly execute the sets of instructions to perform any one or more of the methodologies discussed herein.

The computer system 800 includes a processing device 802, a volatile memory 804 (e.g., read-only memory (ROM), flash memory, dynamic random access memory (DRAM) such as synchronous DRAM (SDRAM), a non-volatile memory 806 (e.g., flash memory, static random access memory (SRAM), etc.), and a data storage device 808, which communicate with each other via a bus 810.

The processing device 802 represents one or more general-purpose processing devices such as a microprocessor, CPU, graphics processing unit (GPU), or the like. More particularly, the processing device 802 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute processing logic 828 or instructions of the system architecture 100 for performing the operations discussed herein.

The computer system 800 may further include a network interface device 812 that provides communication with other machines over the network 140, such as a LAN, an intranet, an extranet, or the Internet. The computer system 800 also may include a video display device 816 (e.g., a liquid crystal display (LCD) or a cathode ray tube (CRT)), an alphanumeric input device 818 (e.g., a keyboard), a cursor control device 820 (e.g., a mouse), and a signal generation device 822 (e.g., a speaker). In some embodiments, the video display device 816 and the alphanumeric input device 818 may include a combined display and input device, such as a touchscreen.

The data storage device 808 may include a non-transitory computer-readable storage medium 824 on which is stored the sets of instructions 826 of the system architecture 100 embodying any one or more of the methodologies or functions described herein. For example, sets of instructions 826 can implement one or more operations performed by one or more of the personal data sharing server 118, the request manager 119, or a client device 120A-N. The sets of instructions 826 of the system architecture 100 may also reside, completely or at least partially, within the volatile memory 804 and/or within the processing device 802 during execution thereof by the computer system 800, the volatile memory 804 and the processing device 802 also constituting computer-readable storage media. The sets of instructions 826 may further be transmitted or received over the network 140 via the network interface device 812.

While the example of the computer-readable storage medium 824 is shown as a single medium, the term "computer-readable storage medium" can include a single medium or multiple media (e.g., a centralized or distributed database, and/or associated caches and servers) that store the sets of instructions 826. The term "computer-readable storage medium" can include any medium that is capable of storing, encoding or carrying a set of instructions for execution by the machine and that causes the machine to perform any one or more of the methodologies of the disclosure. The term "computer-readable storage medium" can include, but is not limited to, solid-state memories, optical media, or magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "providing", "sending", "receiving", "obtaining", "generating", "encrypting", "decrypting", "evaluating", "identifying", "analyzing", "modifying", "converting", "including", "requesting", "determining", or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" and similar terms are used herein to mean serving as an example, instance, or illustration. Any aspect or design described herein as "example" is not necessarily to be construed as preferred or advantageous over other aspects or designs. Rather, use of the words "example" or similar terms is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment," "one embodiment," or "some embodiments," throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above-described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:

receiving, from a first client device associated with a first user account of a personal data sharing platform, a request for a dataset having attributes associated with personal data;

encrypting a first private key, which forms a key pair with a first public key, using a second public key, wherein the second public key and a second private key are associated with the first user account;

encrypting the encrypted first private key using a personal data sharing platform key to generate a cascade-encrypted first private key;

receiving, from a second client device associated with a second user account of the personal data sharing platform, a first dataset comprising one or more personal data values that correspond to the attributes of the requested dataset, wherein the one or more personal data values are encrypted using at least the first public key;

generating partially decrypted information for obtaining the first private key by decrypting an outer layer of the cascade-encrypted first private key to generate the encrypted first private key; and responsive to the request for the dataset having the attributes associated with personal data, providing, to the first client device, the first dataset comprising the one or more encrypted personal data values and the partially decrypted information comprising the encrypted first private key for decryption using the second private key, wherein the first private key is configured to at least partially decrypt the one or more encrypted personal data values.

2. The method of claim 1, wherein:

each personal data value of the one or more personal data values of the first dataset is individually encrypted using the first public key, and the first dataset further comprises the attributes associated with personal data in an unencrypted state.

3. The method of claim 1, further comprising generating the first public key and the first private key responsive to receiving the request for the dataset.

4. The method of claim 1, further comprising providing, to the second client device associated with the second user account, the first public key.

5. The method of claim 1, wherein providing the first dataset to the first client device is further responsive to receiving, at the personal data sharing platform, an indication that a value item was transferred from a first account associated with the first user account to a second account associated with the second user account.

6. The method of claim 1, wherein the personal data sharing platform key comprises at least one of:

a symmetric cryptographic key associated with the personal data sharing platform; or a public key associated with the personal data sharing platform.

7. A system, comprising:

a memory; and a processing device, coupled to the memory, configured to perform operations comprising:

receiving, from a first client device associated with a first user account of a personal data sharing platform, a request for a dataset having attributes associated with personal data;

encrypting a first private key, which forms a key pair with a first public key, using a second public key, wherein the second public key and a second private key are associated with the first user account;

encrypting the encrypted first private key using a personal data sharing platform key to generate a cascade-encrypted first private key;

receiving, from a second client device associated with a second user account of the personal data sharing platform, a first dataset comprising one or more personal data values that correspond to the attributes of the requested dataset, wherein the one or more personal data values are encrypted using at least the first public key;

generating partially decrypted information for obtaining the first private key by decrypting an outer layer of the cascade-encrypted first private key to generate the encrypted first private key; and responsive to the request for the dataset having the attributes associated with personal data, providing, to the first client device, the first dataset comprising the one or more encrypted personal data values and the partially decrypted information comprising the encrypted first private key for decryption using the second private key, wherein the first private key is configured to at least partially decrypt the one or more encrypted personal data values.

8. The system of claim 7, wherein:

each personal data value of the one or more personal data values of the first dataset is individually encrypted using the first public key, and the first dataset further comprises the attributes associated with personal data in an unencrypted state.

9. The system of claim 7, wherein the operations further comprise generating the first public key and the first private key responsive to receiving the request for the dataset.

10. The system of claim 7, wherein the operations further comprise providing, to the second client device associated with the second user account, the first public key.

11. The system of claim 7, wherein providing the first dataset to the first client device is further responsive to receiving, at the personal data sharing platform, an indication that a value item was transferred from a first account associated with the first user account to a second account associated with the second user account.

12. The system of claim 7, wherein the personal data sharing platform key comprises at least one of:

a symmetric cryptographic key associated with the personal data sharing platform; or a public key associated with the personal data sharing platform.

13. A non-transitory computer-readable storage medium comprising instructions that, responsive to execution by a processing device, cause the processing device to perform operations comprising:

receiving, from a first client device associated with a first user account of a personal data sharing platform, a request for a dataset having attributes associated with personal data;

encrypting a first private key, which forms a key pair with a first public key, using a second public key, wherein the second public key and a second private key are associated with the first user account;

encrypting the encrypted first private key using a personal data sharing platform key to generate a cascade-encrypted first private key;

receiving, from a second client device associated with a second user account of the personal data sharing platform, a first dataset comprising one or more personal data values that correspond to the attributes of the requested dataset, wherein the one or more personal data values are encrypted using at least the first public key;

generating partially decrypted information for obtaining the first private key by decrypting an outer layer of the cascade-encrypted first private key to generate the encrypted first private key; and responsive to the request for the dataset having the attributes associated with personal data, providing, to the first client device, the first dataset comprising the one or more encrypted personal data values and the partially decrypted information comprising the encrypted first private key for decryption using the second private key, wherein the first private key is configured to at least partially decrypt the one or more encrypted personal data values.

14. The non-transitory computer-readable storage medium of claim 13, wherein:

each personal data value of the one or more personal data values of the first dataset is individually encrypted using the first public key; and the first dataset further comprises the attributes associated with personal data in an unencrypted state.

15. The non-transitory computer-readable storage medium of claim 13, wherein the operations further comprise providing, to the second client device associated with the second user account, the first public key.

16. The non-transitory computer-readable storage medium of claim 13, wherein the operations further comprise generating the first public key and the first private key responsive to receiving the request for the dataset.

17. The non-transitory computer-readable storage medium of claim 13, wherein providing the first dataset to the first client device is further responsive to receiving, at the personal data sharing platform, an indication that a value item was transferred from a first account associated with the first user account to a second account associated with the second user account.

* * * * *